United States Patent
Ray et al.

(10) Patent No.: US 10,089,115 B2
(45) Date of Patent: Oct. 2, 2018

(54) APPARATUS TO OPTIMIZE GPU THREAD SHARED LOCAL MEMORY ACCESS

(71) Applicant: Intel Corporation, Santa Clara, CA (US)

(72) Inventors: Joydeep Ray, Folsom, CA (US); Abhishek R. Appu, El Dorado Hills, CA (US); James A. Valerio, Hillsboro, OR (US); Bharath Narasimha Swamy, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/203,907

(22) Filed: Jul. 7, 2016

(65) Prior Publication Data

US 2018/0011711 A1    Jan. 11, 2018

(51) Int. Cl.
G06F 9/38 (2006.01)
G06F 13/16 (2006.01)
G06F 12/0806 (2016.01)
G06F 12/084 (2016.01)

(52) U.S. Cl.
CPC .......... *G06F 9/3887* (2013.01); *G06F 12/084* (2013.01); *G06F 12/0806* (2013.01); *G06F 13/1605* (2013.01); *G06F 2212/314* (2013.01)

(58) Field of Classification Search
None
See application file for complete search history.

(56) References Cited

U.S. PATENT DOCUMENTS

| 7,750,915 B1 * | 7/2010 | Acocella ............. G06F 12/0846 345/541 |
|---|---|---|
| 8,266,382 B1 | 9/2012 | Minkin et al. |
| 2008/0109611 A1 | 5/2008 | Liu et al. |
| 2008/0282034 A1 | 11/2008 | Jiao et al. |
| 2011/0072243 A1 | 3/2011 | Qiu et al. |
| 2011/0082961 A1 | 4/2011 | Minkin et al. |

OTHER PUBLICATIONS

PCT International Search Report and Written Opinion of the International Searching Authority for International Application No. PCT/US2017/030900, dated Aug. 1, 2017, 13 pages.

* cited by examiner

*Primary Examiner* — Nicholas R Wilson
(74) *Attorney, Agent, or Firm* — Womble Bond Dickinson (US) LLP

(57) ABSTRACT

One embodiment provides for a graphics processor comprising first logic coupled with a first execution unit, the first logic to receive a first single instruction multiple data (SIMD) message from the first execution unit; second logic coupled with a second execution unit, the second logic to receive a second SIMD message from the second execution unit; and third logic coupled with a bank of shared local memory (SLM), the third logic to receive a first request to access the bank of SLM from the first logic, a second request to access the bank of SLM from the second logic, and in a single access cycle, schedule a read access to a read port for the first request and a write access to a write port for the second request.

21 Claims, 23 Drawing Sheets

APPARATUS TO OPTIMIZE GPU THREAD SHARED LOCAL MEMORY ACCESS

TECHNICAL FIELD

Embodiments generally relate to graphics processing logic. More particularly, embodiments relate to an apparatus to optimize shared local memory access by threads executing on a graphics processor.

BACKGROUND

A graphics thread can access shared local memory (SLM) using a single instruction multiple data (SIMD) message, where each SIMD slot can address an arbitrary location in the SLM region. To provide high bandwidth, SLM has been typically implemented with multiple memory banks, each with a double word (Dword) sized data bus. Each bank of the SLM can provide up to one Dword, or four bytes of data per cycle. The banks can be accessed in parallel, giving the ability to access, in one access cycle, all of the data locations addressed by all the SIMD slots in a SIMD message. However, presence of "bank conflict" in the SIMD slots can reduce the effective bandwidth of the data transfer. Bank conflicts occurs when two or more SIMD slots in a SIMD message addresses the same SLM bank. If the number of access ports per bank is less than the number of slots that are conflicting on a bank, then all slots cannot be serviced by the bank in the same cycle, and access needs to be serialized.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
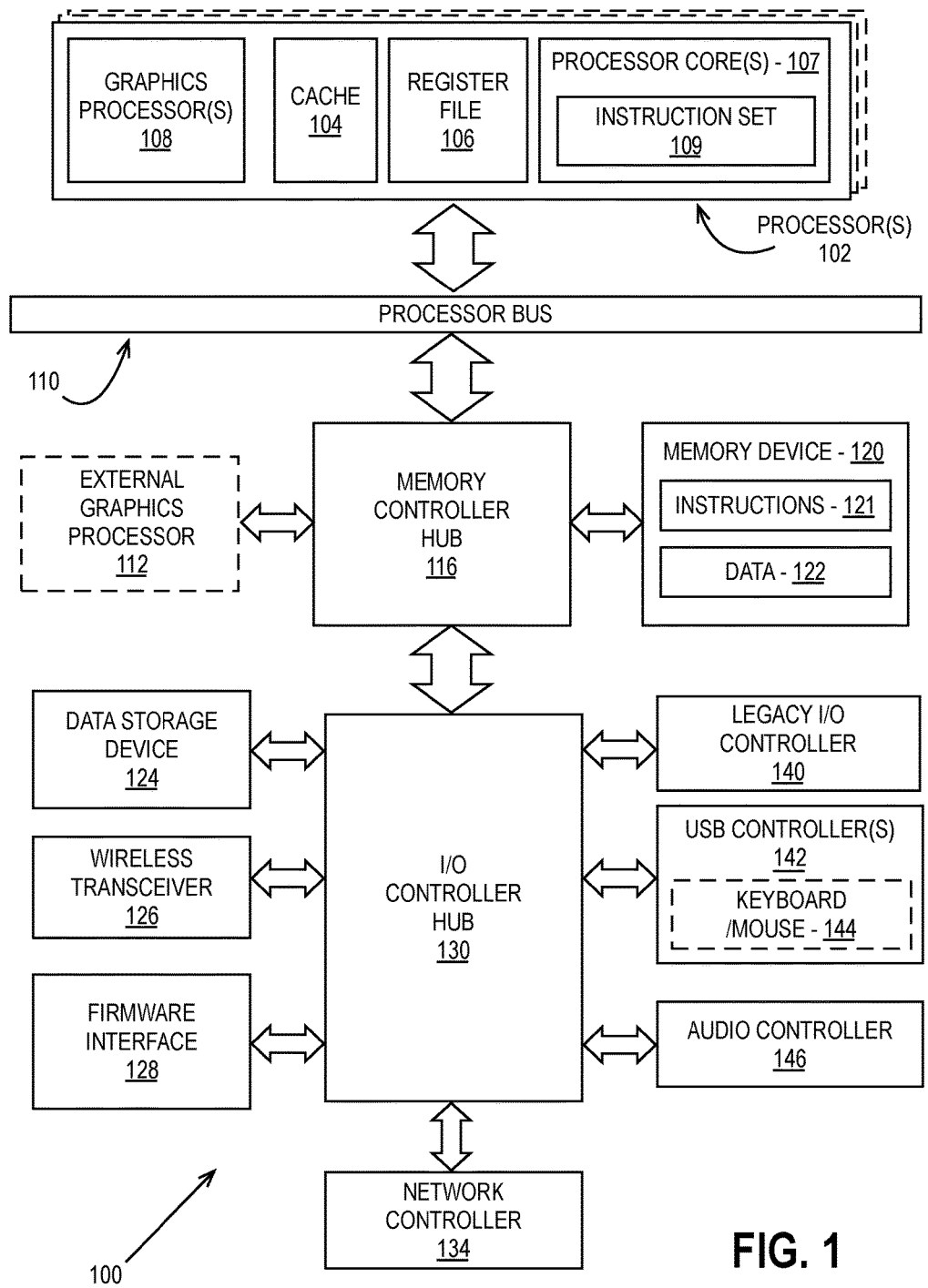
FIG. 1 is a block diagram of an embodiment of a computer system with a processor having one or more processor cores and graphics processors.

Embodiments described herein address limitations with the existing SLM access techniques by simultaneously examining SIMD messages from multiple threads in the same cycle, and using a per-bank port arbitration scheme that maximizes the bank port utilization. Examining the SIMD messages from multiple threads in the same cycle enables configuring SLM access in a manner that reduces bank conflicts. As the arbitrated SIMD messages are from different threads there is no ordering requirement except for Atomic access request messages to the same address.

Embodiments also enable a higher opportunity to merge/combine requests from multiple SIMD messages. For example, if two slots of two SIMD messages access the same address, the access can be combined into a single request. Additionally, if one of SIMD message is a read and other is a write, then arbitration control logic for the bank can schedule both of the requests together, even if the message slots map to the same bank.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 14-21 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
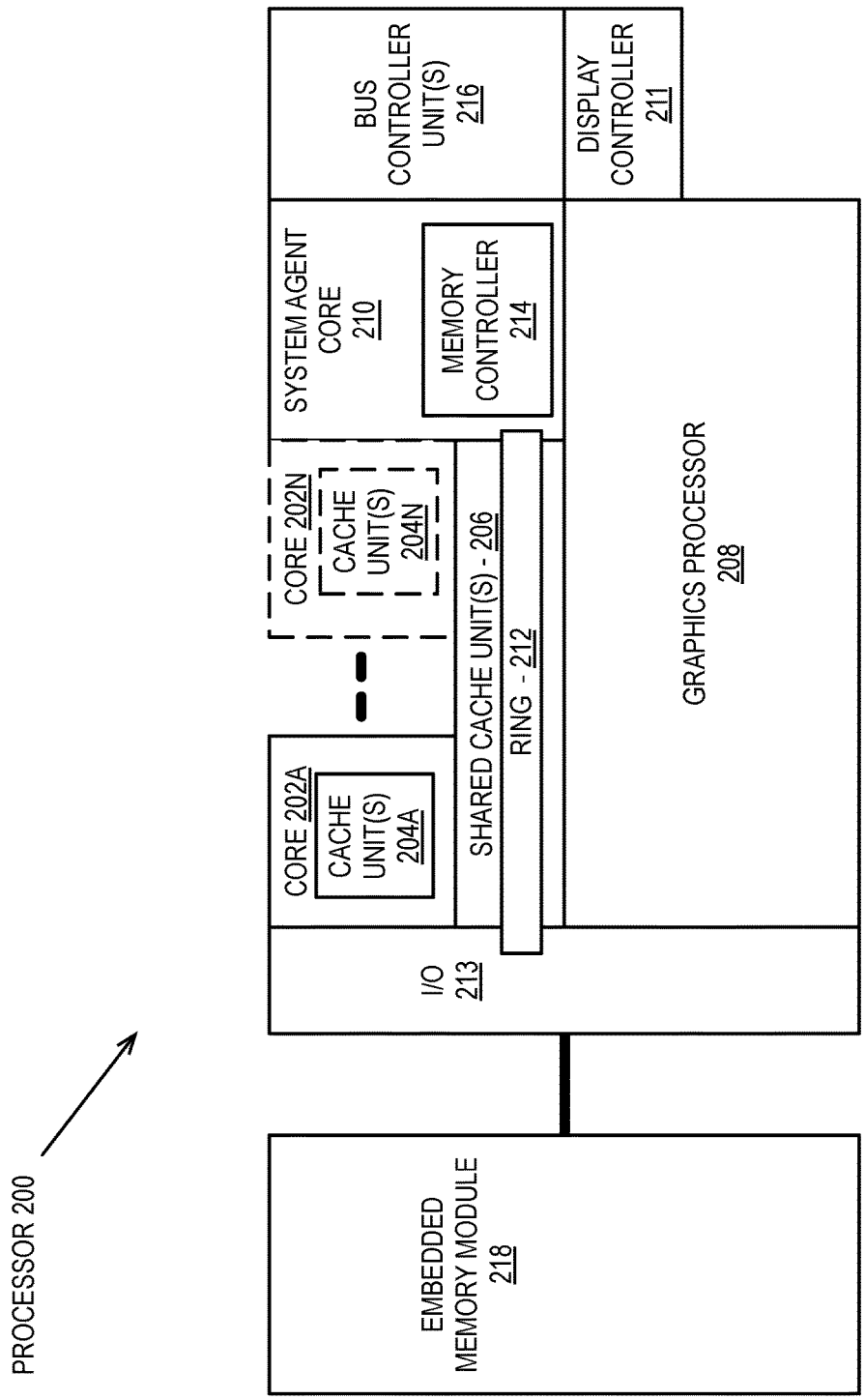
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-

202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
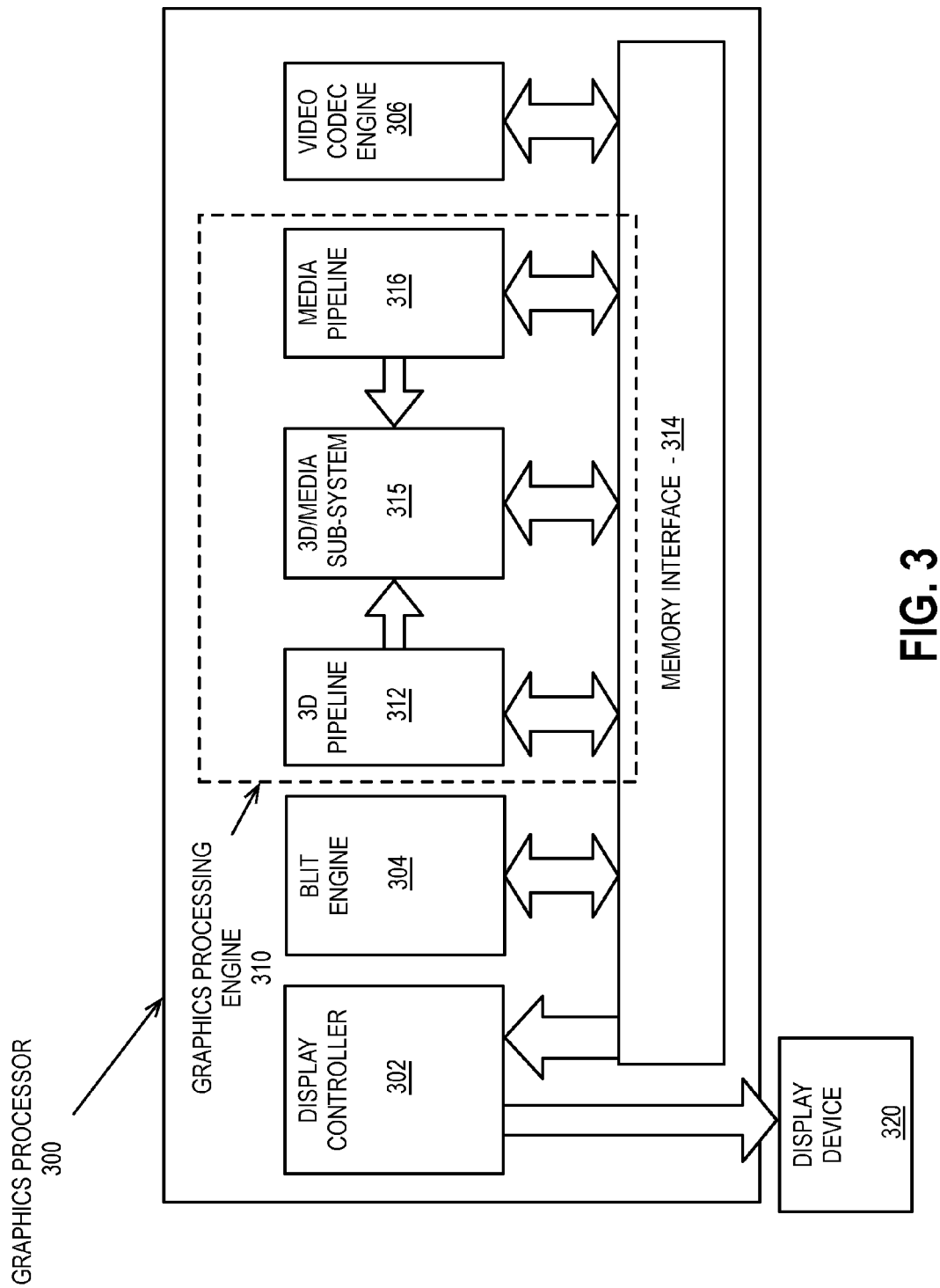
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
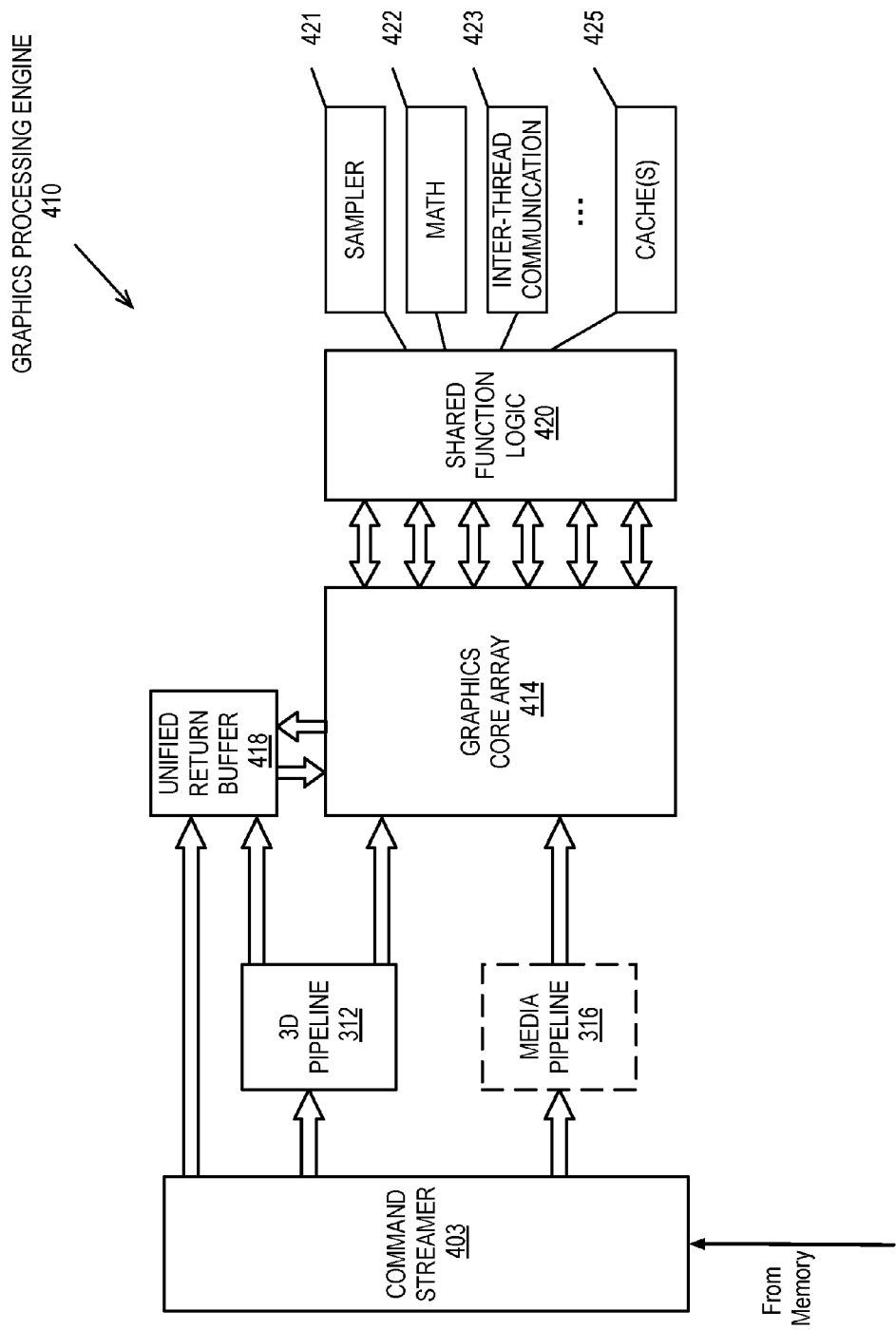
FIG. 4 is a block diagram of an embodiment of a graphics processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
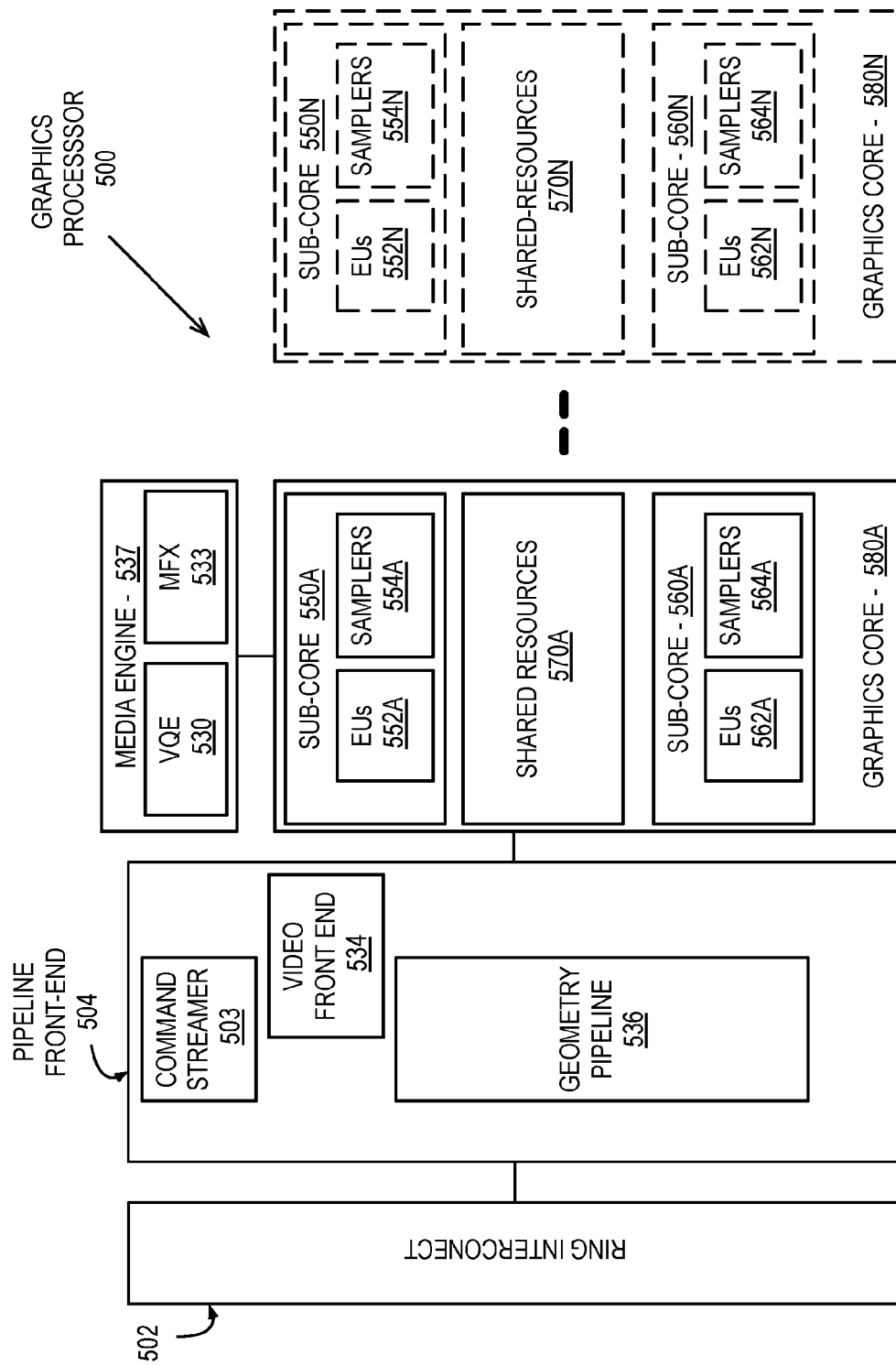
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
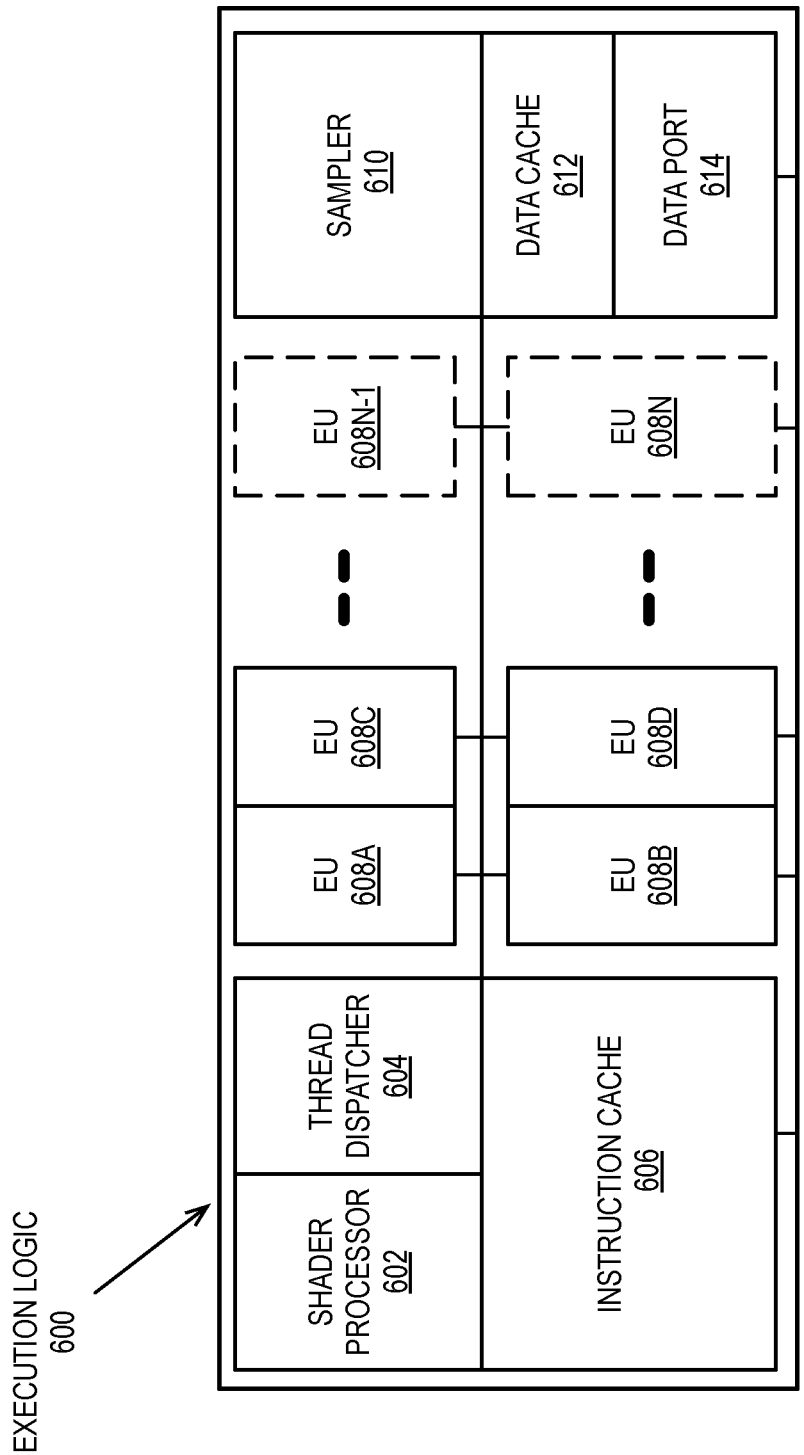
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
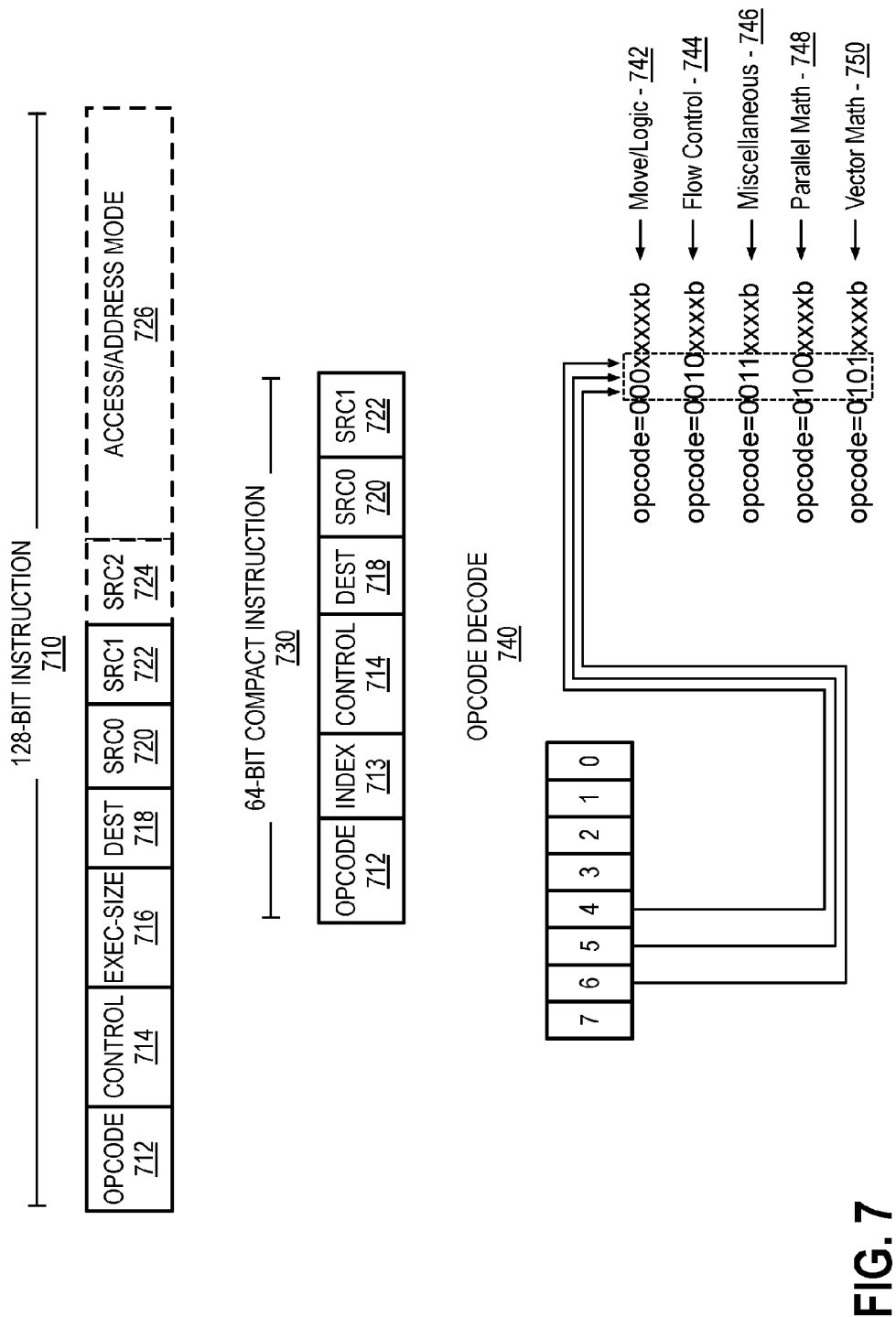
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
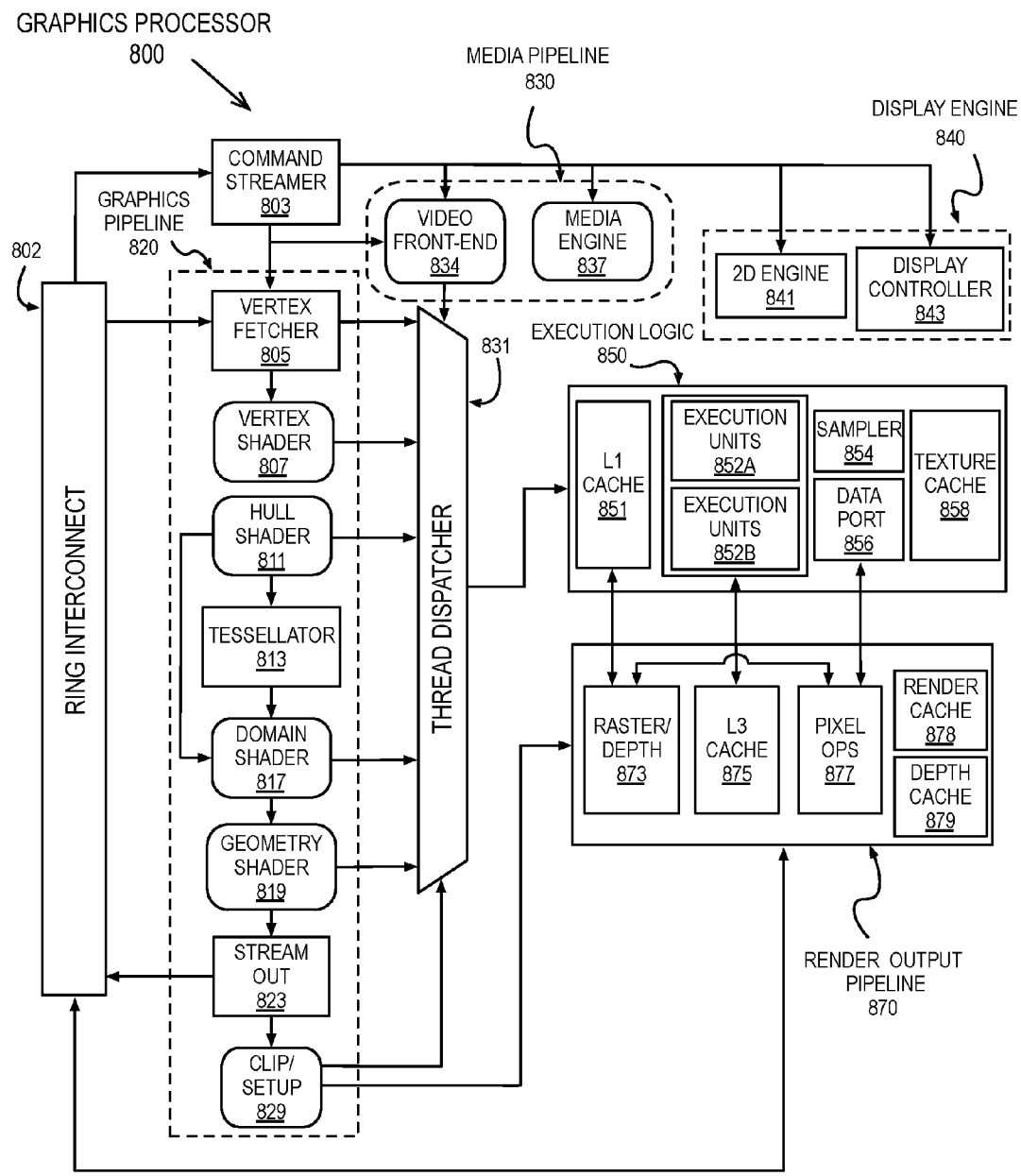
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
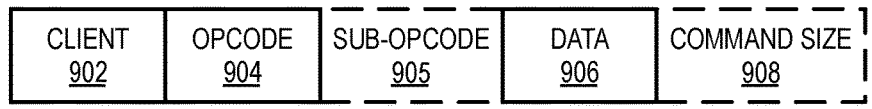
FIG. 9A is a block diagram illustrating a graphics processor command format according to an embodiment.
Figure 9B:
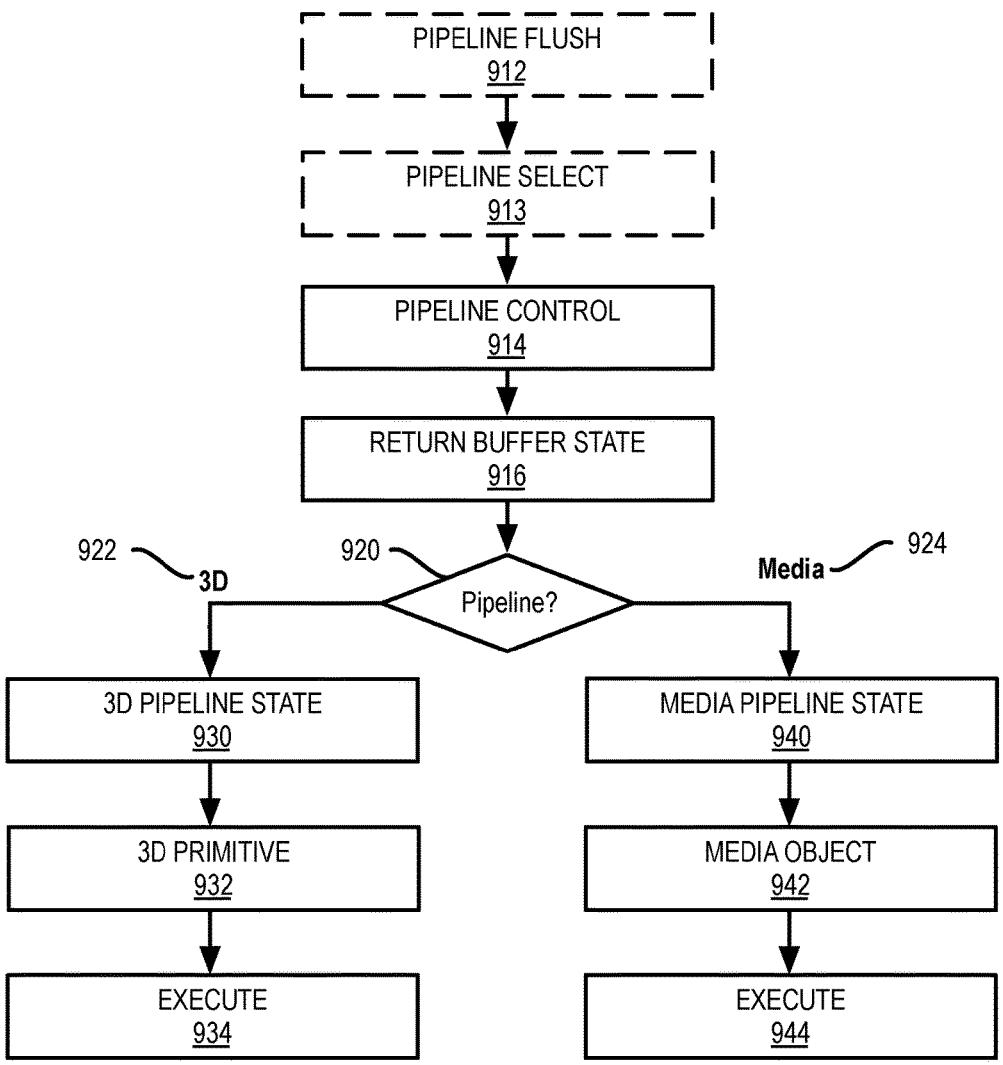
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
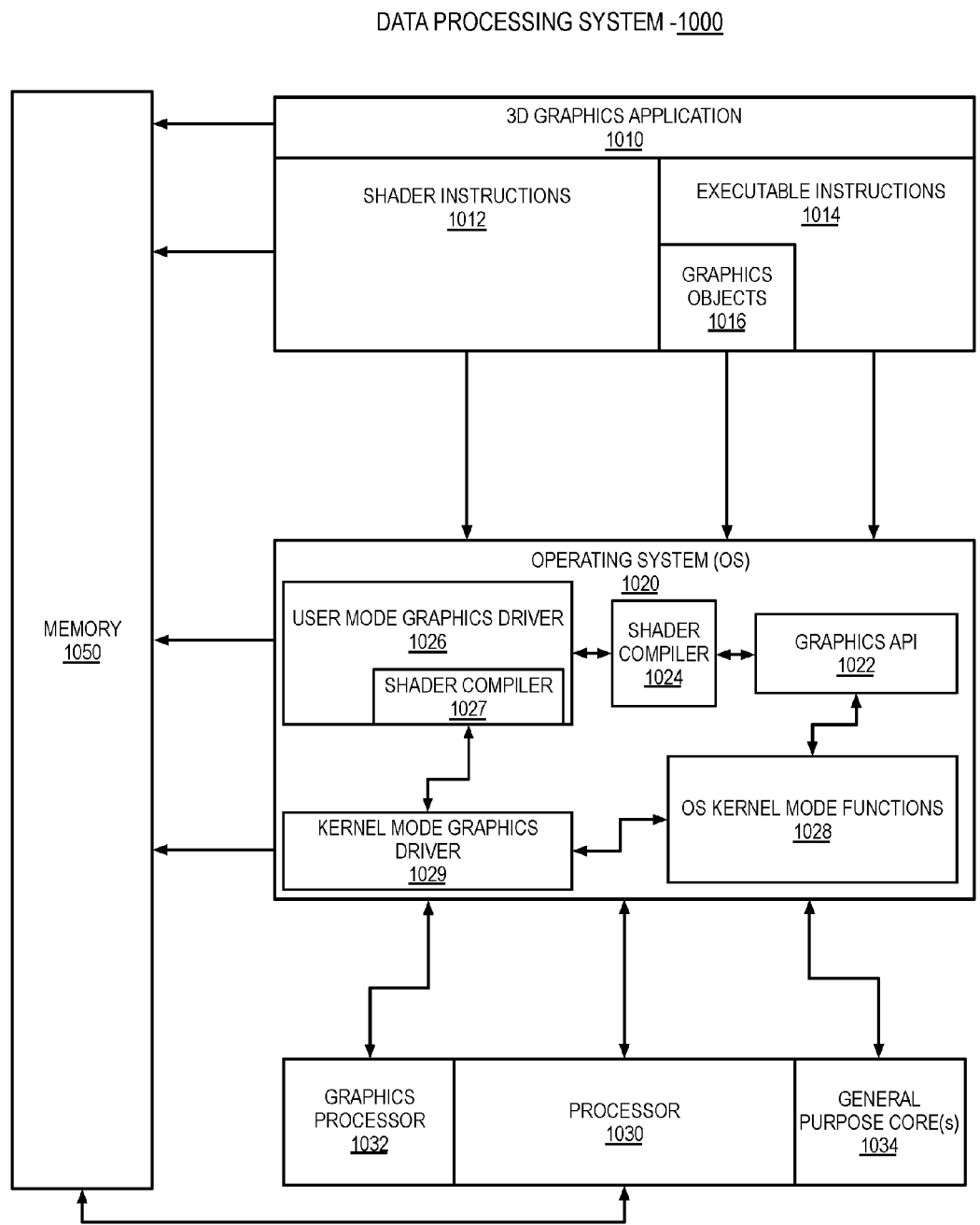
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034.

The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
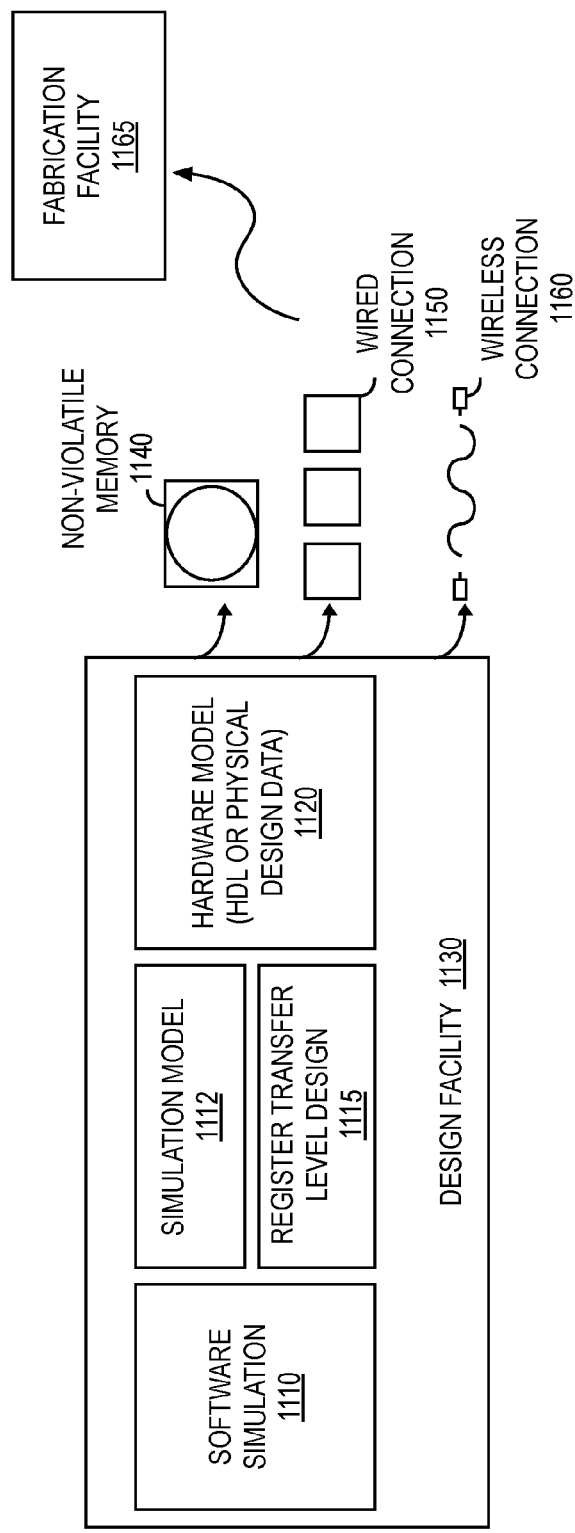
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuits

Figure 12:
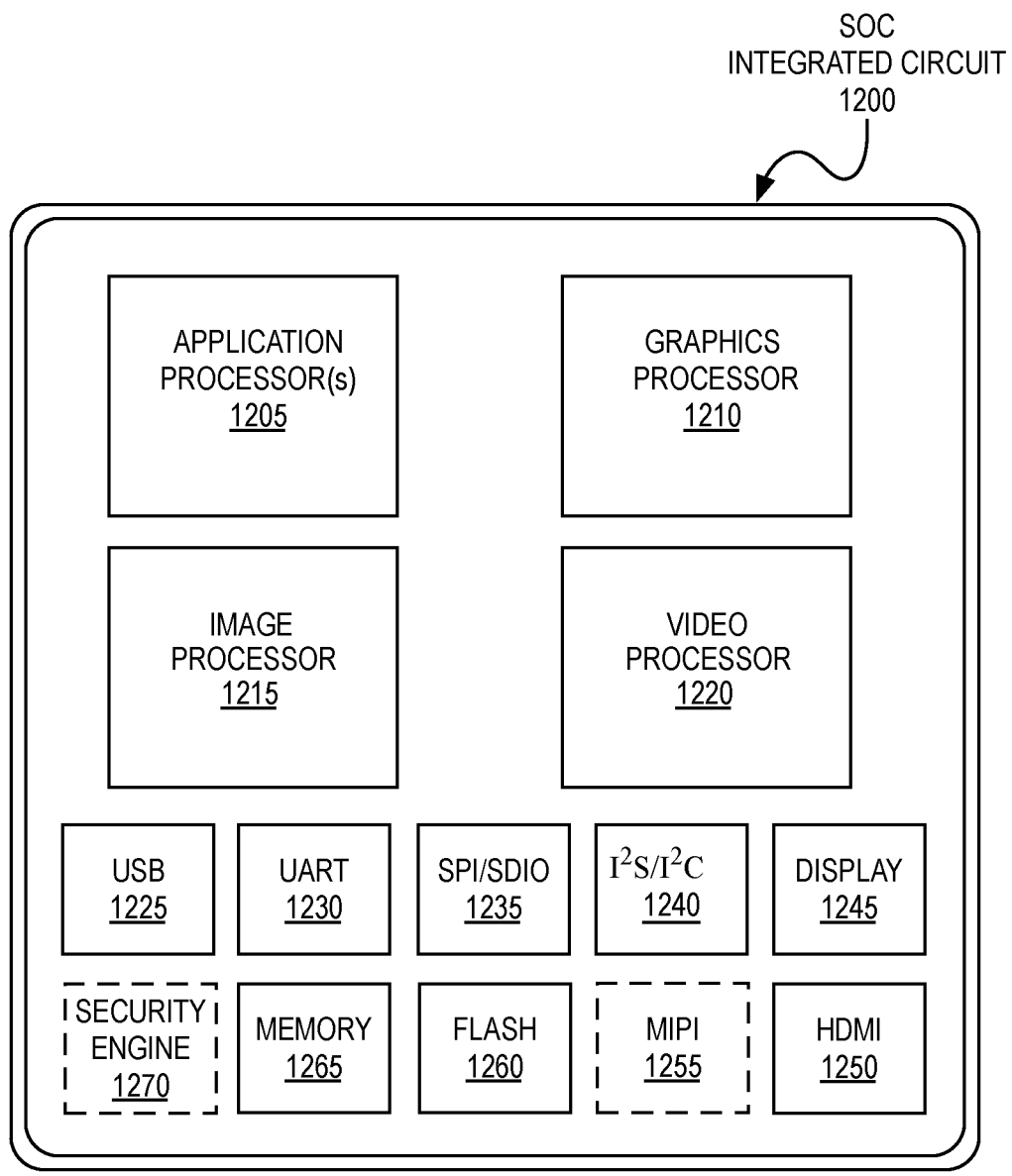
FIG. 12 is a block diagram illustrating an exemplary system on a chip integrated circuit that may be fabricated using one or more IP cores, according to an embodiment.
Figure 13:
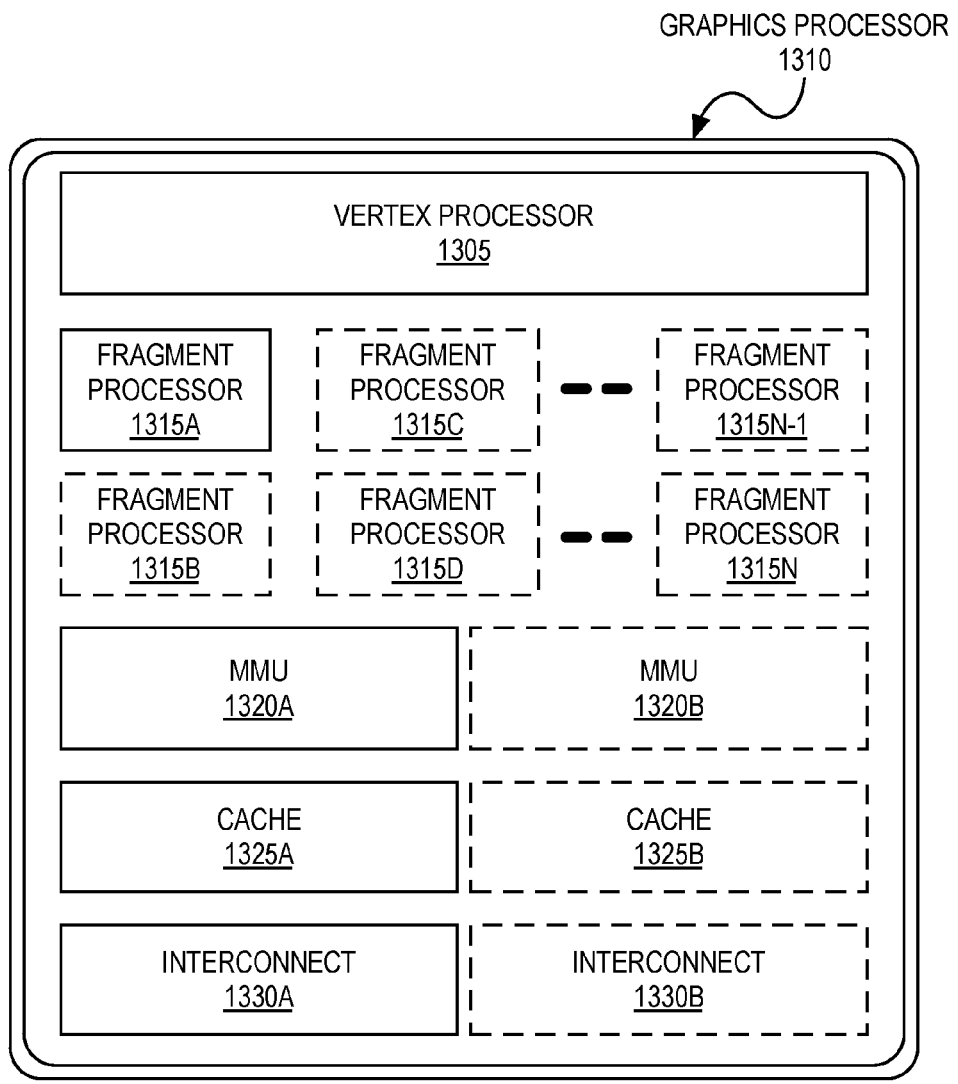
FIG. 13 is a block diagram illustrating an exemplary graphics processor of a system on a chip integrated circuit.
Figure 14:
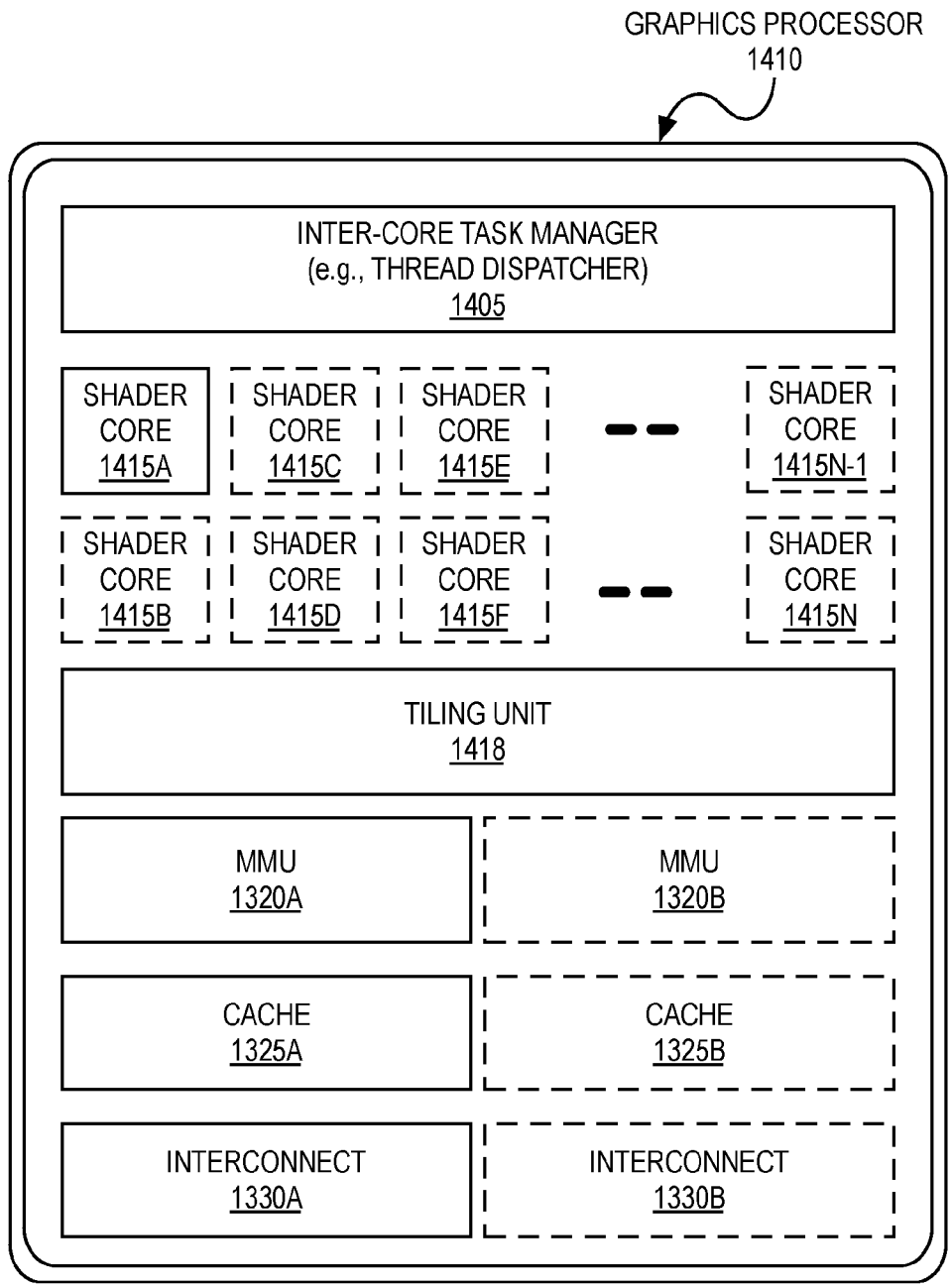
FIG. 14 is a block diagram illustrating an additional exemplary graphics processor of a system on a chip integrated circuit.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12.

Graphics processor 1310 includes a vertex processor 1305 and one or more fragment processor(s) 1315A-1315N. Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Optimizing GPU Thread Shared Local Memory Access

Embodiments described herein provide for improved the performance of GPGPU and 3D shader thread shared local memory (SLM) access in a graphics processor. As described herein, SLM is an architectural memory region, for example, "local memory" as used in the OpenCL specification, that is shared by threads in a GPGPU "thread-group". Each thread group has its own logical SLM region that is not visible from other thread-groups. In a graphics processor, multiple threads belonging to a thread-group that are executing on different execution units (EUs), may need to access the SLM region simultaneously. In one embodiment between eight to sixteen or more EUs can share the same SLM region, which causes dedicating one SLM port per EU to be prohibitively expensive. Instead, SLM implements fewer ports per bank and a "time-multiplexed" port sharing scheme. In this scheme, the SIMD messages from all EUs are arbitrated and only one SIMD message is selected to access the SLM per cycle per port. The selected SIMD message in a given cycle per port is allowed to access to all SLM banks in that cycle. After all of the slots in that SIMD message complete access to the bank, which can take more than one cycle in presence of a bank conflict, a different SIMD message is allowed access to that SLM bank port.

While SLM is described in terms of GPGPU local memory in the OpenCL specification, the access techniques are applicable generally to SLM on a graphics processor, including 3D graphics processor thread access and non-OpenCL GPGPU thread access such based on CUDA, C/C++, or other GPU aware programming languages.

Figure 15:
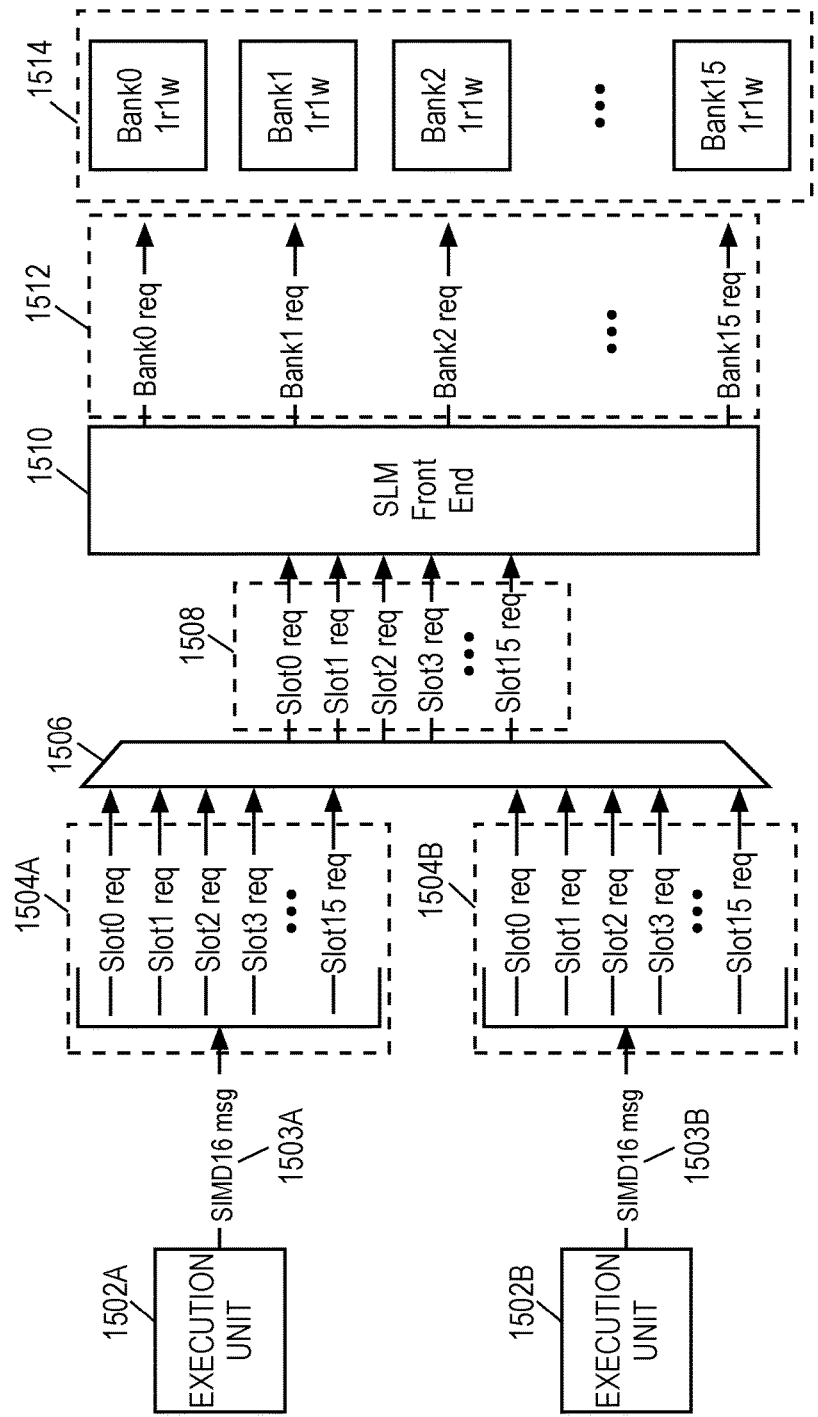
FIG. 15 is an example of time-multiplexed sharing of shared local memory by different execution units.

FIG. 15 is an example of time-multiplexed sharing of shared local memory 1500 by different execution units. As illustrated, two execution units 1502A, 1502B send SIMD16 messages 1503A, 1503B, which are SIMD messages with sixteen slots to the shared SLM unit. A multiplexer 1506 selects one of the two SIMD16 messages (e.g., SIMD16 message 1503A or SIMD16 message 1503B) for processing and reviews the request slots 1504A, 1504B within each message. The sixteen requests from the sixteen SIMD slots of the selected message 1508 is sent to SLM front end (SLMFE) logic 1510. The SLMFE logic 1510 maps individual slot addresses 1512 to corresponding SLM banks 1514 based on a hash function.

The SLMFE logic 1510 also checks for a bank conflict, which occurs when two or more slot addresses map to the same bank. If a bank conflict is detected, the bank access is serialized such that only one of the conflicting requests can be forwarded to the bank port in an access cycle. Thus, s bank conflict can result in a pipeline stall until all sixteen slots from the SIMD16 message are sent to a bank port.

Time-multiplexed sharing of shared local memory 1500 as in FIG. 15, while effective, has limitations. A single SIMD message specifies the same operation (e.g., either Read, Write, or Atomic) for all its slots. However, each SLM bank has a minimum of one read and one write ports, resulting in an underutilization of the bank ports. For example, if the selected SIMD message 1508 that is selected by the multiplexer 1506 is a read operation, the write ports of the bank will be unused in that cycle. Likewise, if the selected SIMD message 1508 is a write operation, the read ports of the bank will be unused in that cycle. Both a write port and a read port of a bank is utilized by Atomic operations, which include both a read and a write. However, the use of SIMD Atomic operations tend to be limited in real-world workloads. Further, when a bank conflict occurs among the slots of a SIMD message, one or more banks will not be accessed in that cycle, potentially underutilizing the SLM banks and lowering the effective performance of the SLM.

An improved SLM access technique provided by embodiments described herein avoids the drawbacks of existing SLM access techniques by examining access slots in other SIMD messages to fill the unused banks during an access cycle. In one embodiment this per-bank port arbitration scheme maximizes the bank port utilization by simultaneously examining at the SIMD messages from multiple threads in the same cycle.

In one embodiment, instead of arbitrating bank access at the entire SIMD message level, per-bank port arbitration logic examines all valid slots from multiple available SIMD messages across multiple thread. Multiple threads can be examined in a single cycle. SIMD message slots that map to the same bank are grouped and access to a bank is arbitrated on a per-port level. Fewer bank conflicts on average result, as the per-bank port arbitration logic examines slots from multiple SIMD messages in the same cycle. For example, a read and write request to the same bank may be scheduled in the same cycle, as the requests are serviced by different ports, which results in a higher average bank utilization. A higher average bank utilization results in higher SLM performance.

Figure 16:
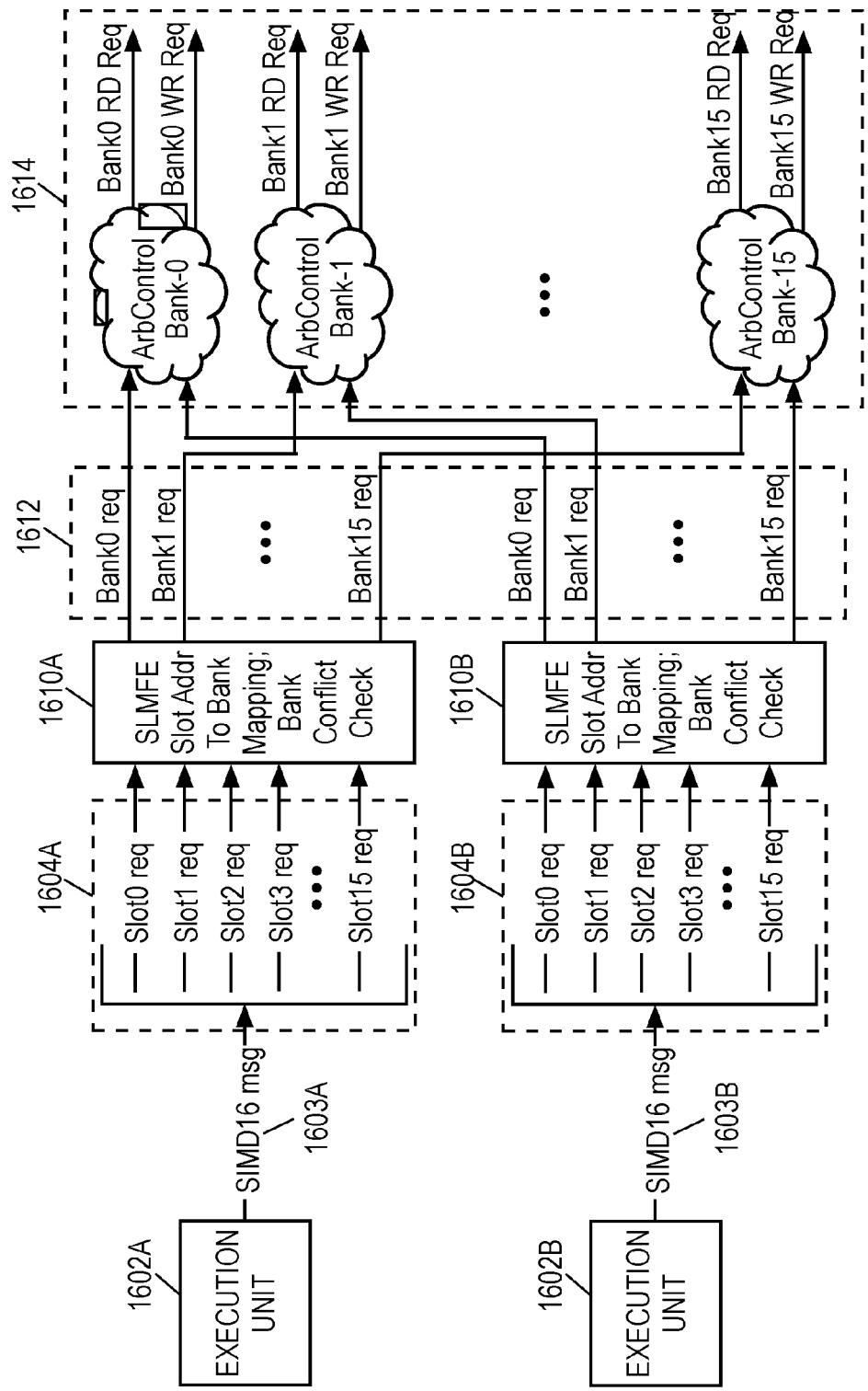
FIG. 16 is a block diagram of shared local memory per-port bank arbitration and scheduling system, according to an embodiment.

FIG. 16 is a block diagram of shared local memory per-port bank arbitration and scheduling system 1600, according to an embodiment. In one embodiment the system 1600 includes multiple execution units 1602A, 1602B, which can each send SIMD16 messages 1603A, 1603B to SLM in a single cycle. The sixteen slots per message can be mapped to a corresponding bank by a SLM front end 1610A, 1610B. In one embodiment a SIMD16 message slot can map to more than one bank if the slot request crosses a Dword boundary and/or the access size is larger than one Dword. In such embodiment all slots are cross checked for bank conflicts.

When the SLMFEs 1610A, 1610B process the slot requests 1604A, 1604B of the incoming SIMD messages 1603A, 1604B, up to 1 request per bank is generated. In the presence of bank conflict within a message, only one of the conflicting requests will be sent per cycle. In one embodiment each EU 1602A, 1602B has a corresponding SLMFE 1610A, 1610B, enabling the slot requests 1604A, 1604B to be processed independently for each SIMD message. In some embodiments, depending on throughput requirements of the graphics processor implementation, the execution units 1602A, 1602B may be multiplexed to a single one of the SLM front ends (e.g., SLMFE 1610A or SLMFE 1610B) and the shares SLM front end can process slot requests 1604A, 1604B for multiple execution units.

A set of bank requests 1612 from each of the slot requests 1604A, 1604B of each SIMD message 1603A, 1603B is processed by per-bank arbitration logic 1614. As illustrated in FIG. 16, arbitration logic for each bank receives, as input, a bank request from each SIMD message 1603A, 1603B and potentially a write-back request for a previous Atomic operations at the bank. The arbitration logic 1614 at each bank schedules a read request and write request at the read and write ports of the bank. The arbitration logic 1614 arbitrates for the read and write port separately from the available requestors, and is generally configured to maximize the utilization of the ports for each bank.

In various embodiments, arbitration logic is configured with various policies that are used to perform arbitration. In one embodiment the arbitration logic at each port tracks all pending writes due to Atomic operations that have been scheduled.

If a write-back is scheduled to a bank from a previous Atomic operation, this write-back is given a higher priority over a new incoming write request. In one embodiment if an incoming request from multiple SIMD messages are of the same type (e.g., read or write) and are valid in the same cycle, round robin arbitration is used to process the requests across multiple cycles. In one embodiment, if multiple incoming requests are to the same address and of the same type, other than Atomic, then the two requests can be merged into a single request. If the two requests are to the same address and are Atomic, then only one request is serviced in a single cycle, as an atomic request will occupy both a read port and a write port. In one embodiment the arbitration logic ensures that a request to a port is not starved during arbitration, for example, due to a dependency stall. If a starvation is detected, all arbitration is blocked until the dependency for the starved request is resolved and the starved request is scheduled.

In one embodiment the arbitration logic checks for true dependency stalls in the pipeline. A true dependency stall includes a scenario in which a new Atomic request from any thread is dependent upon a previous Atomic operation's result and the previous Atomic operation's result has not yet been written back. A true dependency stall also occurs in the event of a new read request from a threads that is dependent upon an Atomic operation's result for that thread that has not yet been written back. In the event of a true dependency, a dependent incoming request is not selected to be performed until the dependency is resolved. In one embodiment, only true dependencies are tracked. For example, ordering restrictions may not be imposed for non-Atomic operations from different threads to the same address.

In one embodiment the arbitration logic at each bank sends a signal back to each SLMFE 1610A, 1610B to indicate whether the request to the bank has been selected by the arbitration logic for scheduling. If a request from an SLMFE is scheduled, the SLMFE can move on to the next request for the bank, either from a different slot of the same SIMD message, or from a new SIMD message. If the request is not scheduled, the request is held as valid and is processed in the next cycle.

The SLM access methods provided by embodiments described herein can achieve higher SLM performance using techniques not possible with prior implementations. By examining message slots multiple SIMD messages in the same cycle, bank conflict opportunities can be reduced. Additionally, a greater opportunity to merge or combine requests from multiple SIMD messages. For example, if multiple message slots from multiple messages read or write the same address, the SLM access can be combined in to a single bank request in the per-bank arbitration stage. Additionally, when arbitrating SIMD messages from different threads, there is no access ordering requirement except for Atomic messages to the same address. Further, while in previous SLM access schemes bank arbitration handled only one type of operation per cycle, either Read, Write, or Atomic, the arbitration control logic provided by embodiments described herein more efficiently utilize bank read and write ports by attempting to use both a read port and a write port for a bank during each access cycle.

Figure 17:
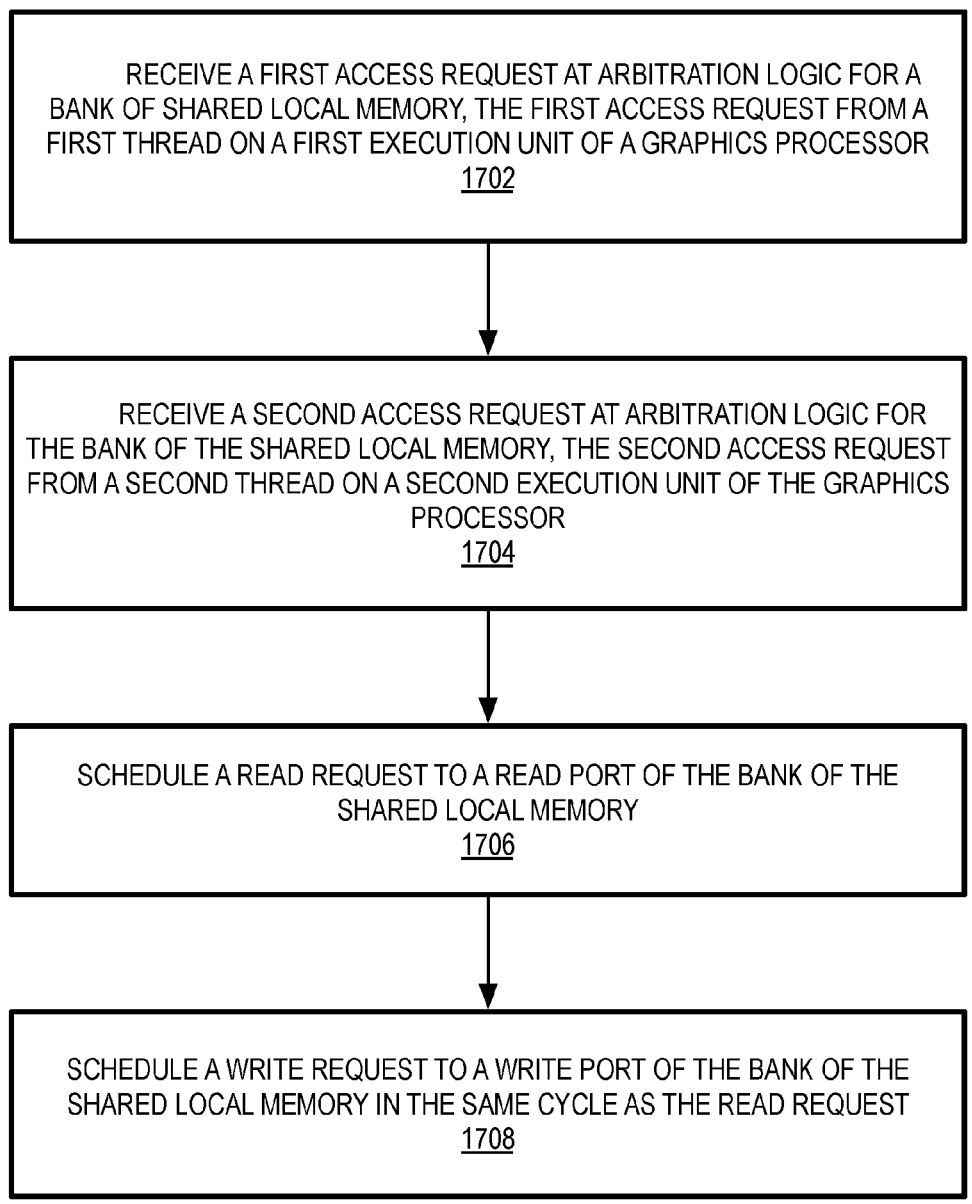
FIG. 17 is a flow diagram of per-port bank arbitration logic for graphics processor shared local memory, according to an embodiment.

FIG. 17 is a flow diagram of per-port bank arbitration logic 1700 for graphics processor shared local memory, according to an embodiment. In one embodiment the per-port bank arbitration logic can be coupled with or associated with each bank of shared local memory, as illustrated with respect to the arbitration control logic 1614 of FIG. 16. The per-port bank arbitration logic 1700 arbitrates requests to the bank and schedules requests to one or more read and write ports at the bank of shared local memory.

As shown at 1702, the per-port bank arbitration logic 1700 can receive a first access request at arbitration logic for a bank of shared local memory. The first access request can be received from a first thread on a first execution unit of a graphics processor.

As shown at 1704, the per-port bank arbitration logic 1700 can receive a second access request at arbitration logic for a bank of shared local memory. The second access request can be received from a second thread on a second execution unit of a graphics processor.

As shown at 1706, the per-port bank arbitration logic 1700, after receiving at least the first access request and the second access request, can schedule a read request to a read port of the bank of shared local memory. The logic can then schedule a write request to a write port of the bank of shared local memory in the same cycle as the read request is scheduled, where one of the first request and the second request is a read request and the other request is a write request, as shown at 1708.

Figure 18:
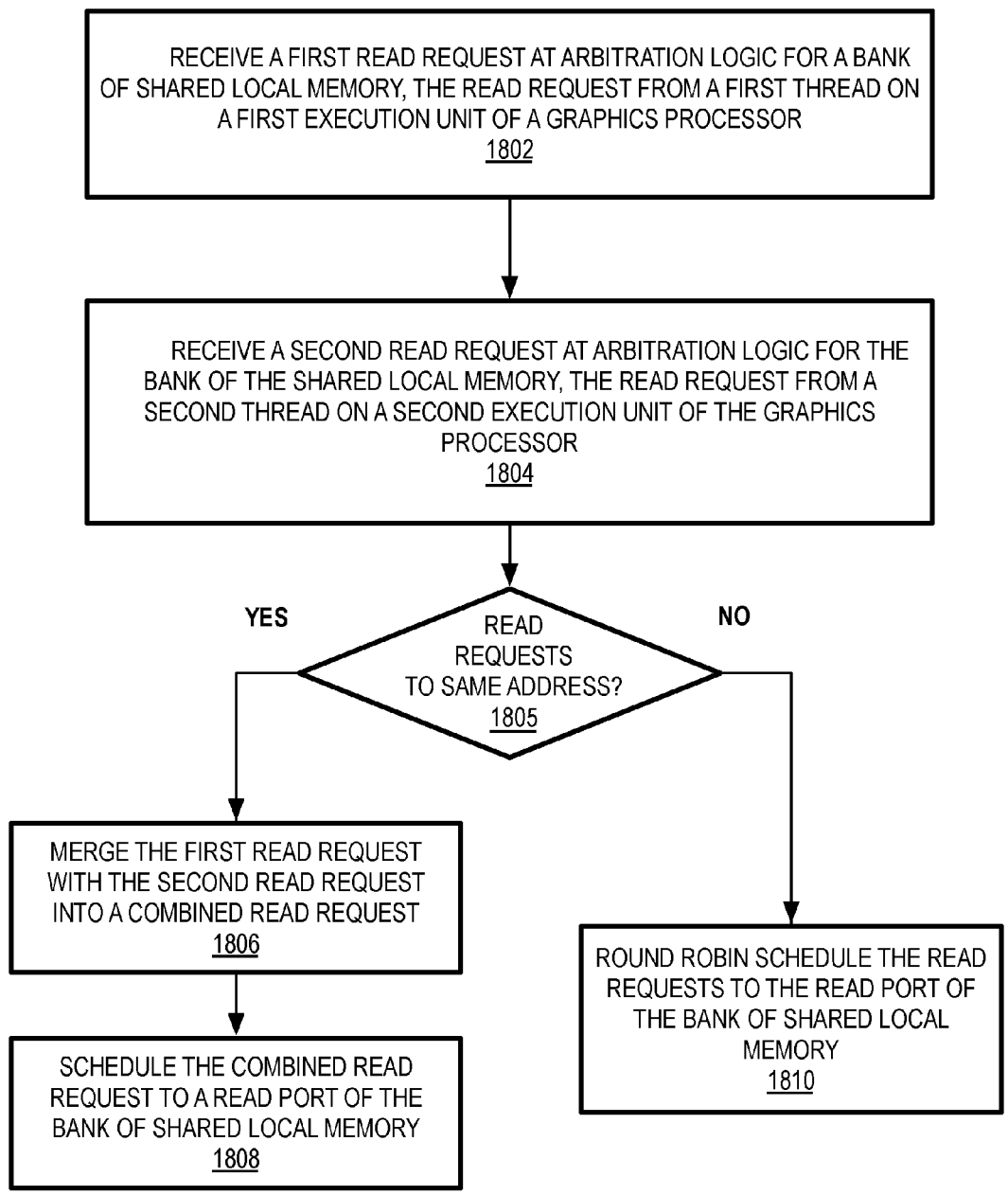
FIG. 18 is a flow diagram of access merge logic, according to an embodiment.

FIG. 18 is a flow diagram of access merge logic 1800, according to an embodiment. In one embodiment the per-port bank arbitration logic 1700 as in FIG. 17 can perform access merges according to the access merge logic 1800. The access merge logic 1800 can be used to merge read or write requests from multiple threads into a single access of multiple requests of the same type and to the same address. As the arbitrated SIMD messages are from different threads, there is no ordering requirement except for Atomic messages to the same address. For non-atomic access requests, operations may proceed as follows.

In one embodiment, the access merge logic 1800 can receive a receive a first read request at arbitration logic (e.g., per-port bank arbitration logic 1700 as in FIG. 17) for a bank of shared local memory, where the read request is from a first thread on a first execution unit of a graphics processor, as shown at 1802.

At 1804, the access merge logic 1800 can receive a second read request at arbitration logic for the bank of the shared local memory, the read request from a second thread on a second execution unit of the graphics processor.

At 1805, the access merge logic 1800 can determine if the first read request and the second read request are each to the same address. If the read requests are to the same address, at 1806, the access merge logic 1800 can merge the first read request with the second read request into a combined read request. The combined read request can be scheduled to a read port of the bank of shared local memory at 1808. If the read requests are determined at 1805 to not be to the same address, the access merge logic 1800 can round robin schedule the read requests to the read port of the bank of shared local memory, as shown at 1810.

While the access merge logic 1800 is illustrated and described as performing a merge of read requests from multiple threads, the merge operations are not limited to read requests. In one embodiment, write requests may be merged in a similar manner.

Figure 19A:
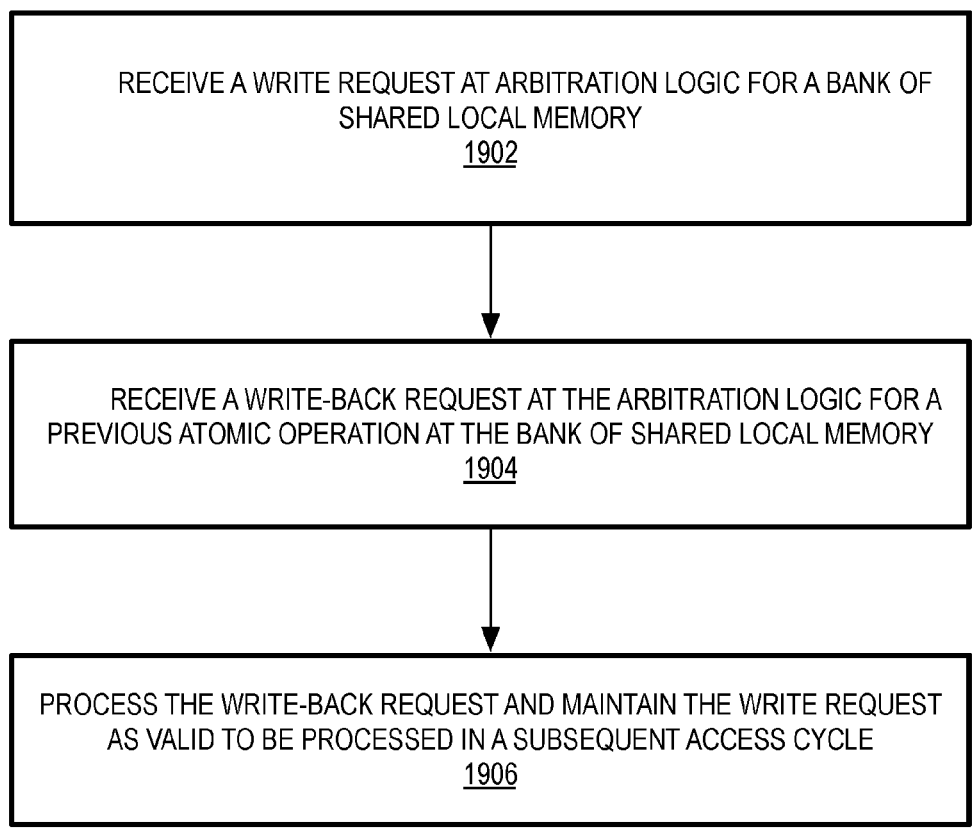
FIGS. 19A-C are flow diagrams of access priority logic according to embodiments.
Figure 19B:
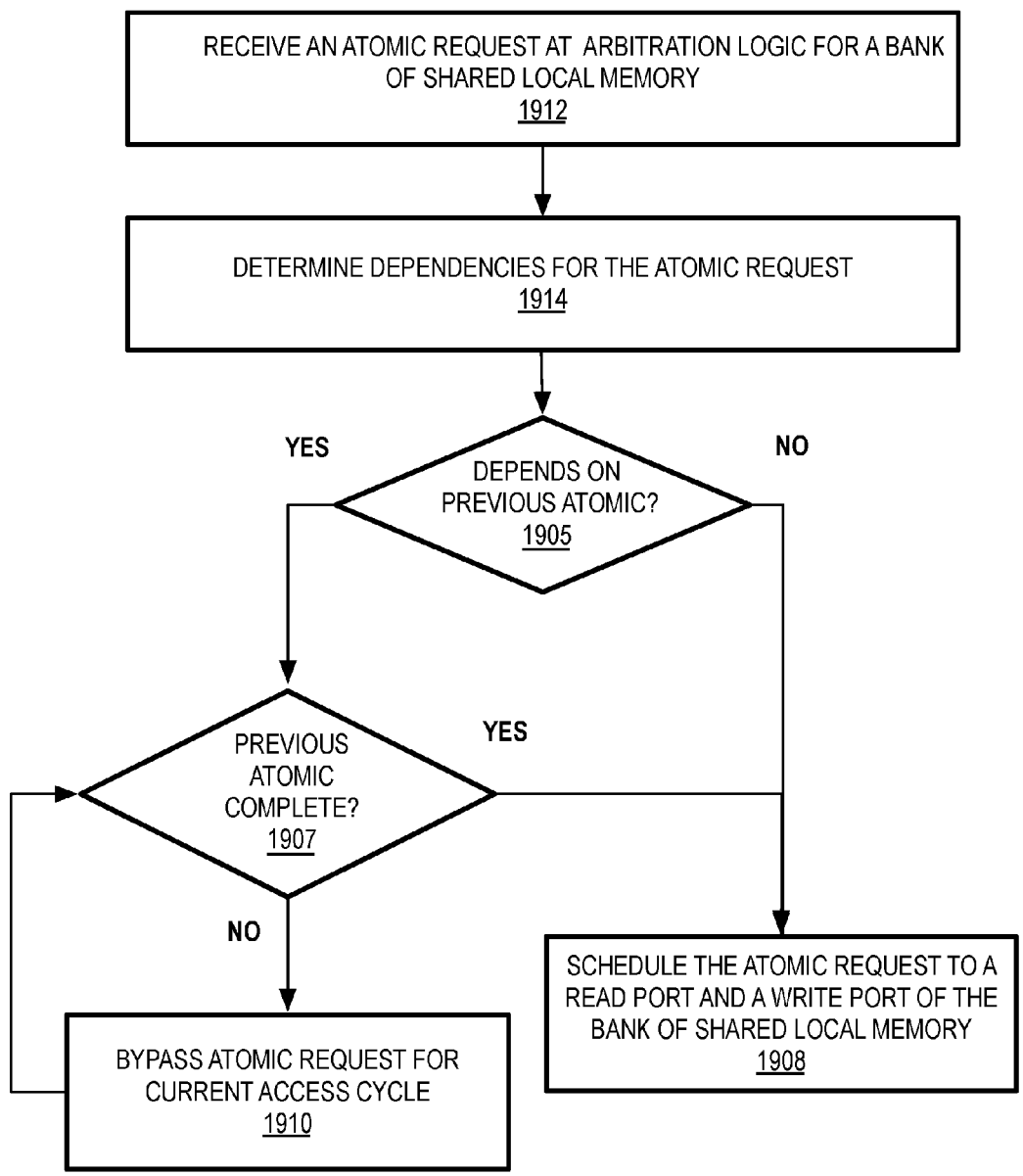
Figure 19C:
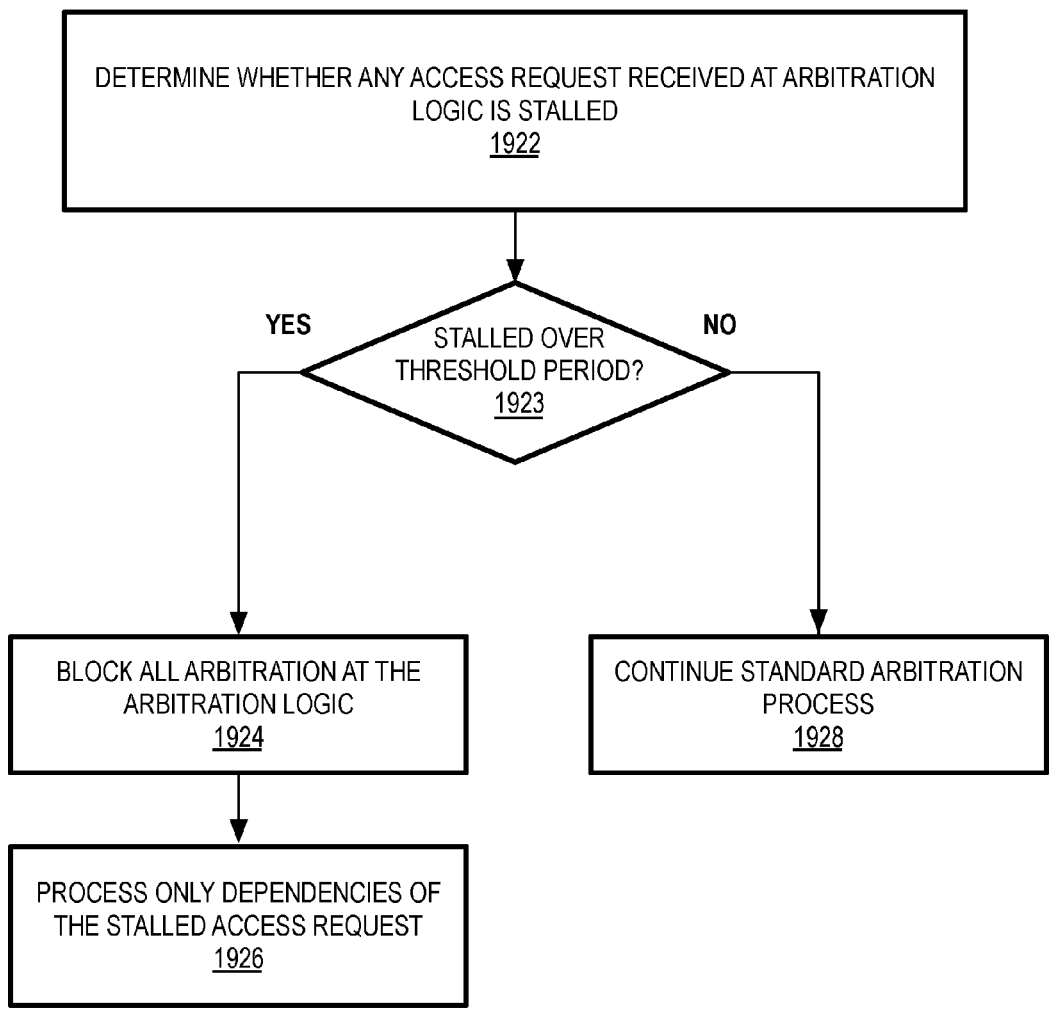

FIGS. 19A-C are flow diagrams of access priority logic 1900, 1910, 1920 according to embodiments. The access priority logic 1900, 1910, 1920 can be implemented by the per-port bank arbitration logic 1700 as in FIG. 17 to as a portion of the arbitration logic by which a subset of multiple incoming requests to the bank of shared local memory is serviced within a cycle.

As illustrated in FIG. 19A, access priority logic 1900 can give write-back operations from previous Atomic operations priority over new incoming write requests. At 1902 access priority logic 1900 can process a non-Atomic write request received at the arbitration logic for a bank of shared local memory. At 1904 the access priority logic 1900 can process a write-back request at the arbitration logic for a previous Atomic operation at the bank of share local memory. In this instance, as shown at 1906, the access priority logic 1900 determines to process the Atomic write-back request and maintain the non-atomic write request as valid to be processed in a subsequent access cycle.

As illustrated in FIG. 19B, access priority logic 1910 can track dependencies for Atomic operations to check for true dependency stalls in the shared local memory pipeline. As shown at 1912, access priority logic 1910 can process an Atomic write request received at the arbitration logic for a bank of shared local memory.

At 1914 the access priority logic 1910 can determine the set of dependencies for the Atomic request. If the access priority logic 1910 determines at 1905 that the received Atomic request from any thread depends on a previous Atomic request, the logic can determine at 1907 whether the previous Atomic operation is complete. For example, a write-back operation for a previous Atomic request may be pending, such that the previous Atomic is not complete until the write-back request is processed. If the access priority logic 1910 determines that the previous atomic is complete at 1907, the logic can proceed to schedule the Atomic request to a read port and a write port of the bank of shared local memory at 1908.

If at 1907 it is determined at the previous Atomic operation is not complete at 1907, the access priority logic 1910 determines to bypass the received Atomic request for the current access cycle. Bypassing the Atomic request may result in the scheduling of other pending requests to the read port and/or write port of the bank of shared local memory.

As illustrated in FIG. 19C, access priority logic 1920 can track stalled operations, such as Atomic operation that are waiting for a dependency to resolve. For example and in one embodiment, the access priority logic 1920 can initially determine if any access requests received at the arbitration logic is stalled, as shown at 1922. The access priority logic 1920 can then determine whether an access request has been stalled for a period exceeding a threshold, as shown at 1923.

If at 1923 the access priority logic 1920 determines that an access request has not been stalled for over a threshold period of time, the access priority logic 1920 can direct the per-port bank arbitration logic to continue the standard arbitration process, as shown at 1928.

If at 1923 the access priority logic 1920 determines that an access request is stalled over a threshold period of time, the access priority logic 1920 can block all arbitration logic performed by the per-port bank arbitration logic at 1924. The access priority logic 1920 can then direct the per-port bank arbitration logic to process only dependencies of the stalled access request, as shown at 1926.

While some embodiments have been described with respect to arbitration logic at a single bank of shared local memory, those skilled in the art will recognize that per-port bank arbitration logic may be included at each bank of shared local memory. Additionally, each bank will include at least one read port and at least one write port. In some embodiments, each bank of the shard local memory can include multiple read ports and/or multiple write ports.

Figure 20:
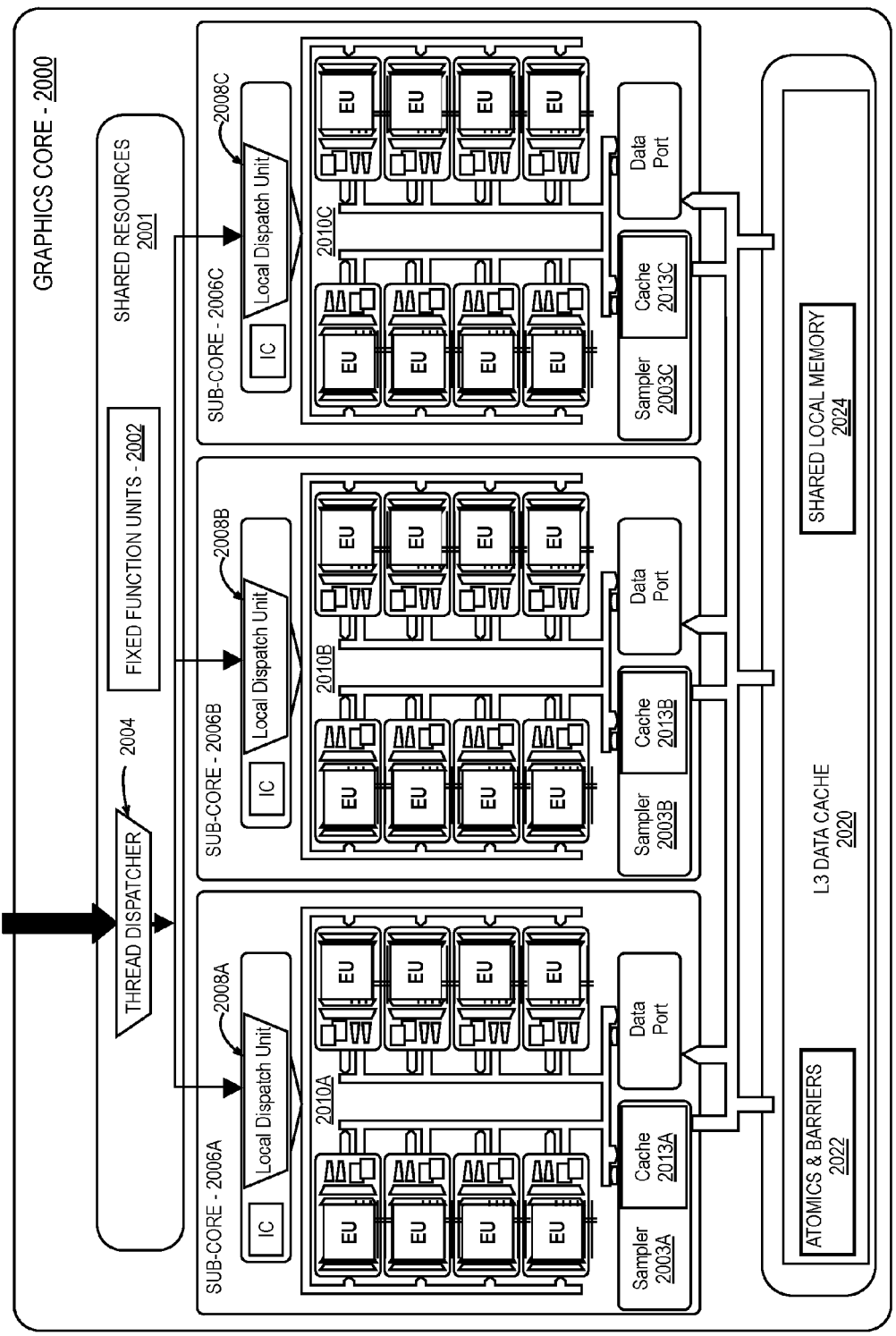
FIG. 20 is a block diagram of a graphics core including logic to perform operations associated with embodiments described herein.

FIG. 20 is a block diagram of a graphics core 2000 including logic to perform operations associated with embodiments described herein. The graphics core 2000 includes execution resources sufficient to perform general purpose graphics and compute operations. Multiple threads may execute simultaneously on the graphics core 2000. In one embodiment the graphics core 2000 (e.g., slice) includes a cluster of sub-cores 2006A, 2006B, 2006C, which may be variants of the sub-cores 550A-550N of FIG. 5. In one embodiment the graphics core includes shared resources 2001, such as the shared function logic 420 of FIG. 4. However, in the illustrated embodiment each of the sub-cores 2006A-2006C includes sampler resources 2003A-2003C and a sampler cache 2013A, 2013B, 2013C. In one embodiment the shared resources 2001 include of a set of fixed function units 2002, for example, to support media, two-dimensional graphics functionality, and pixel back end operations for graphics and image processing. For programmable graphics and computational processing, a thread dispatcher 2004 can dispatch execution threads to the various sub-cores 2006A-2006C, where a local dispatch unit 2008A-2008C dispatches execution threads to the execution unit groups 2010A, 2010B, 2010C in each of the sub-cores. The number of execution units in each of the execution unit groups 2010A-2010C can vary among embodiments. Execution units within each group 2010A-C can also be dynamically enabled or disabled based on workload, power, or thermal conditions.

In one embodiment, a level three (L3) data cache 2020 is shared between each of the sub-cores 2006A-C. The L3 data cache 2020 can include an atomics & barriers unit 2022 and shared local memory 2024. The atomics & barriers unit 2022 includes dedicated logic to support implementation of barriers across groups of threads and is available as a hardware alternative to pure compiler or software based barrier implementations. Additionally, the atomics & barriers unit 2022 enables a suite of atomic read-modify-write memory operations to the L3 data cache 2020 or to the shared local memory 2024. Atomic operations to global memory can be supported via the L3 data cache 2020.

In one embodiment, the shared local memory 2024 supports programmer managed data for sharing amongst hardware threads, with access latency similar to the access latency to the L3 data cache 2020. In one embodiment, the shared local memory 2024 sharing is limited to between threads within the same sub-core 2006A-C, however, not all embodiments share such limitation.

Threads executing on the execution resources of the graphics core 2000 can access the shared local memory 2024 using the access techniques described herein. The shared local memory 2024, in one embodiment, includes sixteen banks, each bank including at least one read port and at least one write port. Other embodiments includes greater than or fewer than sixteen banks, where each bank can include multiple read ports and/or multiple write ports. The arbitration control logic 1614 as in FIG. 16 can couple to each bank of the shared local memory 2024 to arbitrate access to the memory by various threads executing on the execution unit groups 2010A-C. While per-port bank arbitration is described with respect to the shared local memory 2024 of the illustrated graphics core 2000, the techniques described herein are generally applicable to multi-port banked memory that is shared by multiple threads of a graphics processor.

Figure 21:
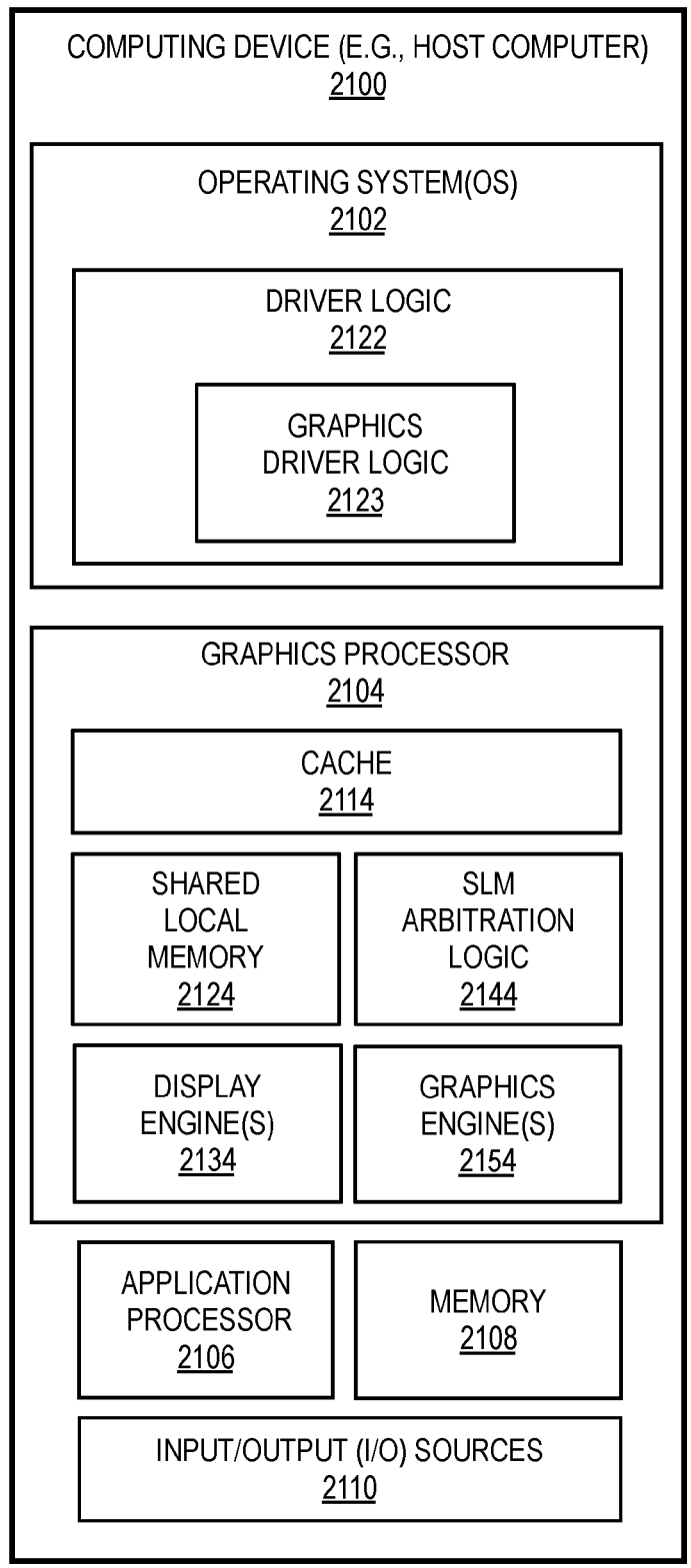
FIG. 21 is a block diagram of a computing device including a graphics processor, according to an embodiment.

FIG. 21 is a block diagram of a computing device 2100 including a graphics processor 2104, according to an embodiment. The computing device 2100 can be a computing device such as the data processing system 100 as in of FIG. 1. The computing device 2100 may also be or be included within a communication device such as a set-top box (e.g., Internet-based cable television set-top boxes, etc.), global positioning system (GPS)-based devices, etc. The computing device 2100 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2100 includes a mobile computing device employing an integrated circuit ("IC"), such as system on a chip ("SoC" or "SOC"), integrating various hardware and/or software components of computing device 2100 on a single chip.

The computing device 2100 includes a graphics processor 2104, which may be any graphics processor described herein. The graphics processor 2104 includes on-chip shared local memory 2124 to store data locally within the graphics processor 2104 for low latency access. The graphics processor 2104 also includes shared local memory (SLM) arbitration logic 2144 to provide per-port arbitration for access requests to the shared local memory 2124. In one embodiment a cache memory 2114, such as an L3 cache, or other type of cache memory can also contain shared local memory. In one embodiment the cache 2114 is an embedded memory module, such as the embedded memory modules 218 of FIG. 2, a portion of which may also be accessed using the per-bank arbitration techniques described herein.

The graphics processor also includes one or more graphics engine(s) 2154, which may include one or more instances of the graphics core 2000 of FIG. 20, or any graphics execution logic described herein, such as the execution logic 600 of FIG. 6. The graphics engine(s) 2154 include execution resources to execute graphics processor threads that access the shared local memory 2124 via the SLM arbitration logic 2144.

The graphics processor 2104 also includes a display engine 2134 to couple the graphics processor to a display device. Data that is processed by the graphics processor 2104 is stored in a buffer within a hardware graphics pipeline and state information is stored in memory 2108. The resulting image is then transferred to a display controller of the display engine 2134 for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

As illustrated, in one embodiment, in addition to a graphics processor 2104, the computing device 2100 may further include any number and type of hardware components and/or software components, such as (but not limited to) an application processor 2106, memory 2108, and input/output (I/O) sources 2110. The application processor 2106 can interact with a hardware graphics pipeline, as illustrated with reference to FIG. 3, to share graphics pipeline functionality. The application processor 2106 can include one or processors, such as processor(s) 102 of FIG. 1, and may be the central processing unit (CPU) that is used at least in part to execute an operating system (OS) 2102 for the computing device 2100. The OS 2102 can serve as an interface between hardware and/or physical resources of the computer device 2100 and a user. The OS 2102 can include driver logic 2122 for various hardware devices in the computing device 2100. The driver logic 2122 can include graphics driver logic 2123 such as the user mode graphics driver 1026 and/or kernel mode graphics driver 1029 of FIG. 10. In one embodiment the graphics driver logic 2123 is configured to receive compute kernels from a compute API to execute on the graphics engines 2154.

It is contemplated that in some embodiments, the graphics processor 2104 may exist as part of the application processor 2106 (such as part of a physical CPU package) in which case, at least a portion of the memory 2108 may be shared by the application processor 2106 and graphics processor 2104, although at least a portion of the memory 2108 may be exclusive to the graphics processor 2104, or the graphics processor 2104 may have a separate store of memory. The memory 2108 may comprise a pre-allocated region of a buffer (e.g., framebuffer); however, it should be understood by one of ordinary skill in the art that the embodiments are not so limited, and that any memory accessible to the lower graphics pipeline may be used. The memory 2108 may include various forms of random access memory (RAM) (e.g., SDRAM, SRAM, etc.) comprising an application that makes use of the graphics processor 2104 to render a desktop or 3D graphics scene. A memory controller hub, such as memory controller hub 116 of FIG. 1, may access data in the memory 2108 and forward it to graphics processor 2104 for graphics pipeline processing. The memory 2108 may be made available to other components within the computing device 2100. For example, any data (e.g., input graphics data) received from various I/O sources 2110 of the computing device 2100 can be temporarily queued into memory 2108 prior to their being operated upon by one or more processor(s) (e.g., application processor 2106) in the implementation of a software program or application. Similarly, data that a software program determines should be sent from the computing device 2100 to an outside entity through one of the computing system interfaces, or stored into an internal storage element, is often temporarily queued in memory 2108 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2110 may include one or more I/O devices that are implemented for transferring data to and/or from the computing device 2100 (e.g., a networking adapter); or, for a large-scale non-volatile storage within the computing device 2100 (e.g., hard disk drive). User input devices, including alphanumeric and other keys, may be used to communicate information and command selections to graphics processor 2104. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2100 may be employed to observe gestures, record audio and video and to receive and transmit visual and audio commands.

I/O sources 2110 configured as one or more network interface(s) can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2100 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processor comprising:
   first logic coupled with a first execution unit, the first logic to receive a first single instruction multiple data (SIMD) message from the first execution unit;
   second logic coupled with a second execution unit, the second logic to receive a second SIMD message from the second execution unit; and
   third logic coupled with a bank of shared local memory (SLM), the third logic to receive a first request to access the bank of SLM from the first logic, a second request to access the bank of SLM from the second logic, and in a single access cycle, schedule a read access to a read port for the first request and a write access to a write port for the second request.

2. The graphics processor as in claim 1, wherein the third logic is to additionally receive a third request to access the bank of SLM, wherein the third request is write request to the bank of SLM, the second request is a write-back request associated with a previous atomic operation at the bank of SLM, and the third logic is to prioritize the second request over the third request.

3. The graphics processor as in claim 2, wherein the third logic is to maintain the third request as valid and is configured to process the third request in a subsequent access cycle.

4. The graphics processor as in claim 1, wherein the third logic is to additionally receive a third request to access the bank of the SLM, wherein the third request is a write request to the bank of SLM from the first logic and the write access to the write port is a combined write for the second request and the third request.

5. The graphics processor as in claim 1, wherein the third logic is to additionally receive a third request to access the bank of the SLM, wherein the third request is a read request to the bank of SLM from the second logic and the read access to the read port is a combined read for the first request and the third request.

6. The graphics processor as in claim 1, wherein the first request is from a first thread on the first execution unit and the second request is from a second, different thread on the second execution unit.

7. The graphics processor as in claim 6, wherein the first request is a read request from the first thread and the second request is a write request from the second thread.

8. The graphics processor as in claim 1, wherein the first message includes a plurality of slots, wherein the first logic is to examine each slot of the plurality of slots within the first SIMD message and determine an associated bank of SLM for each SLM access request within the first SIMD message.

9. The graphics processor as in claim 8, wherein the second message includes a plurality of slots, wherein the second logic is to examine each slot of the plurality of slots within the second SIMD message and determine an associated bank of SLM for each SLM access request within the second SIMD message.

10. The graphics processor as in claim 9, wherein the first logic is to detect a bank conflict within the first SIMD message and the second logic is to detect a bank conflict within the second SIMD message.

11. The graphics processor as in claim 10, wherein the first request to access a first port of the bank of SLM is one of a set of conflicting requests received at the first logic.

12. The graphics processor as in claim 11, wherein the second request to access the second port of the bank of SLM is one of a set of conflicting requests received at the second logic.

13. The graphics processor as in claim 1, additionally comprising multiple instances of the third logic, wherein each bank of the SLM couples with an instance of the third logic.

14. The graphics processor as in claim 13, wherein the SIMD message includes 16 slots and the SLM includes 16 banks.

15. A method for accessing shared local memory (SLM) within a graphics processor, the method comprising:
   receiving a first access request at arbitration logic for a bank of the SLM, the first access request from a first thread on a first execution unit of the graphics processor;
   receiving a second access request at arbitration logic for the bank of the SLM, the second access request from a second thread on a second execution unit of the graphics processor;
   scheduling a read request to a read port of the bank of the SLM in a single cycle; and
   scheduling a write request to a write port of the bank of the SLM in the single cycle, wherein each of the read request and the write request is associated with one of the first access request or the second access request.

16. The method as in claim 15, additionally comprising:
   receiving a first single instruction multiple data (SIMD) message from the first execution unit at a first circuit of a graphics processor, the first SIMD message including multiple access requests to the SLM;
   determining, at the first circuit, a mapping to one or more banks of the SLM for each of the multiple access requests to the SLM; and
   transmitting the first access request to the arbitration logic for the bank of the SLM for at least one of the multiple access requests in first SIMD message.

17. The method as in claim 15, additionally comprising:
   receiving a second single instruction multiple data (SIMD) message from the second execution unit at a second circuit of a graphics processor, the second SIMD message including multiple access requests to the SLM;
   determining, at the second circuit, a mapping to one or more banks of the SLM for each of the multiple access requests to the SLM; and
   transmitting the second access request to the arbitration logic for the bank of the SLM for at least one of the multiple access requests in the second SIMD message.

18. The method as in claim 15, additionally comprising
   receiving a third access request at arbitration logic for a bank of the SLM, the third access request from the first thread on a first execution unit of the graphics processor; and
   merging the third access request with the second access request from the second thread.

19. The method as in claim 15, additionally comprising
   receiving a third access request at arbitration logic for a bank of the SLM, the third access request from the second thread on a first execution unit of the graphics processor; and
   merging the third access request with the first access request from the second first.

20. The method as in claim 15, additionally comprising
   receiving a third access request at arbitration logic for a bank of the SLM, wherein the third request is write request to the bank of SLM, the second request is a write-back request associated with a previous atomic operation at the bank of SLM;
   scheduling the write request to the write port of the bank of the SLM for the second request;
   maintaining the third request as a valid request; and
   processing the third request in a subsequent access cycle.

21. The method as in claim 15, additionally comprising
   determining that a third access request at arbitration logic for a bank of the SLM has been stalled for a period exceeding a threshold due to an unresolved dependency;
   blocking arbitration at the arbitration logic; and
   processing only dependencies of the third access request.

* * * * *